United States Patent [19]
Kakimoto et al.

[11] Patent Number: 6,101,928
[45] Date of Patent: Aug. 15, 2000

[54] AUTOMATIC BREAD PRODUCING MACHINE

[75] Inventors: Yasuhiro Kakimoto, Nara; Takahiro Ohshita, Kobe; Noriyuki Yamamoto, Sanda, all of Japan

[73] Assignee: Matsushita Electric Industrial Co., Ltd., Japan

[21] Appl. No.: 09/371,197

[22] Filed: Aug. 10, 1999

Related U.S. Application Data

[62] Division of application No. 09/219,922, Dec. 23, 1998, which is a division of application No. 08/918,803, Aug. 26, 1997, Pat. No. 5,887,512, which is a division of application No. 08/530,631, Sep. 20, 1995, Pat. No. 5,694,832.

[30] Foreign Application Priority Data

Jan. 6, 1995 [JP] Japan ............................................. 7-774
Mar. 8, 1995 [JP] Japan ........................................ 7-48420

[51] Int. Cl.$^7$ .................................................... A47J 27/00
[52] U.S. Cl. ................................................. 99/348; 366/98
[58] Field of Search ............................. 99/348, 483, 468; 366/98, 144, 145, 146, 97, 96, 69

[56] References Cited

U.S. PATENT DOCUMENTS

| | | | |
|---|---|---|---|
| 4,957,040 | 9/1990 | Nakakura et al. | 99/348 |
| 4,977,822 | 12/1990 | Seo et al. | 99/348 |
| 5,588,353 | 12/1996 | Glucksman et al. | 99/348 |

*Primary Examiner*—Reginald L. Alexander
*Attorney, Agent, or Firm*—Rossi & Associates

[57] ABSTRACT

An automatic bread producing machine includes, in a baking chamber, a vessel unit having a bread vessel where a mixing vane for mixing bread ingredients is rotatably provided and a cylindrical bread vessel support fixed to an underside of the bread vessel. The bread vessel support has stoppers formed on the lower circumference thereof. The machine further includes a vessel mounting support mounted at the bottom of the baking chamber for receiving therein the bread vessel support. The vessel mounting support has cutouts formed at its circumferential wall for receiving and firmly holding the stoppers, respectively. Recessed portions are further formed at the circumferential wall of the vessel mounting support for guiding the stoppers to positions adjacent to the corresponding cutouts, respectively. Each cutout is provided adjacent to a lower end of the recessed portion and at one side of the recessed portion located in a rotation direction of the mixing vane. Each stopper is automatically received and locked in position in the corresponding cutout due to a rotation force of the mixing vane so that the vessel unit is automatically fixed relative to the vessel mounting support. While the stoppers are locked in position, an upper surface of each stopper engages with an upper wall surface of the corresponding cutout. The upper surfaces of each stopper and cutout are so shaped as to urge the vessel unit downward during rotation of the mixing vane.

4 Claims, 12 Drawing Sheets

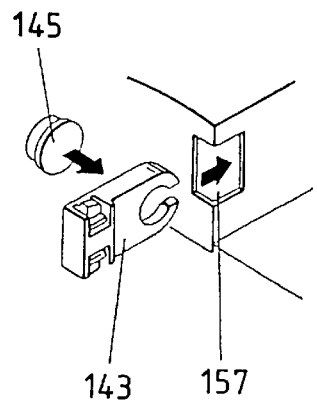
FIG. 19A
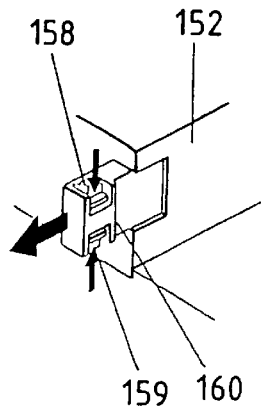
FIG. 19B
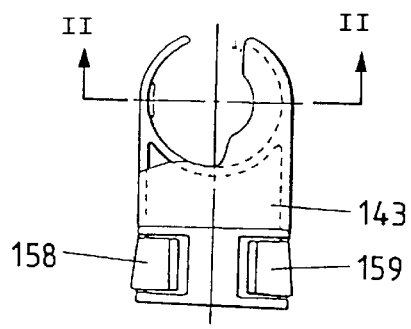
FIG. 20A
FIG. 21
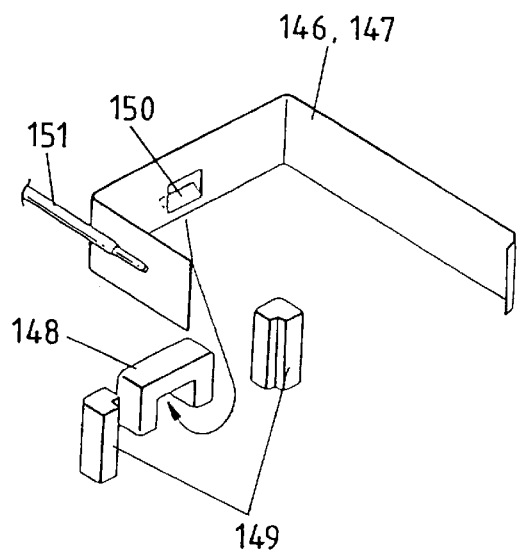
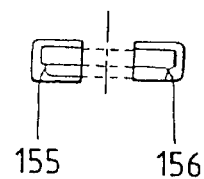
FIG. 20B FIG. 26A
PRIOR ART
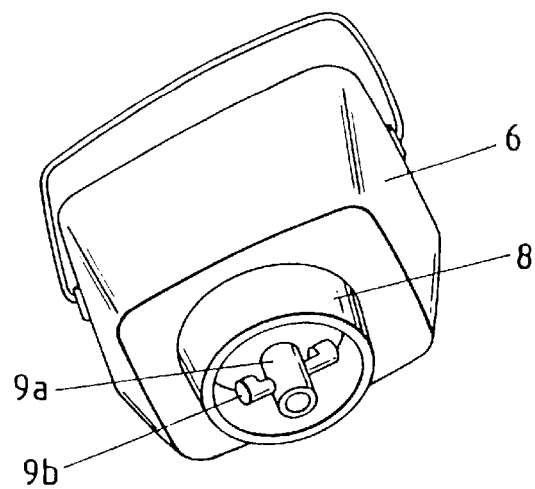
FIG. 26B
PRIOR ART
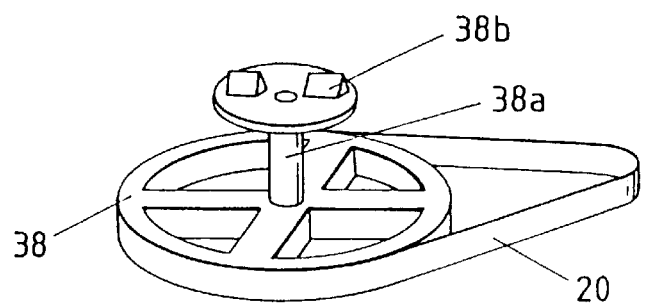
FIG. 27A
PRIOR ART
FIG. 27B
PRIOR ART
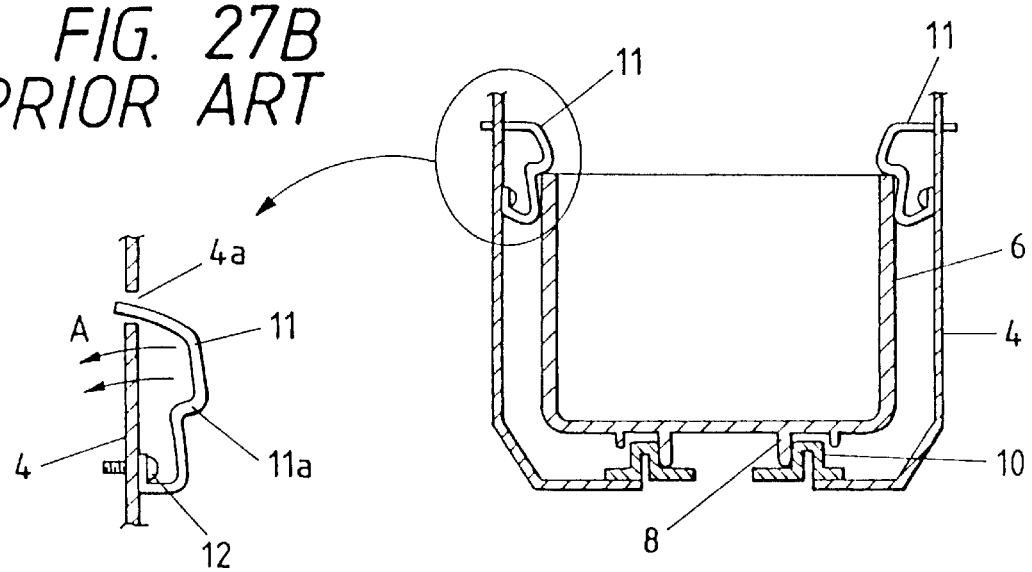

AUTOMATIC BREAD PRODUCING MACHINE

This is a Division of application Ser. No. 09/219,922 filed Dec. 23, 1998, which is a divisional application of Ser. No. 08/918,803 filed Aug. 26, 1997 now issued as U.S. Pat. No. 5,887,512, which is a divisional of Ser. No. 08/530,631, filed Sep. 20, 1995 now issued as U.S. Pat. No. 5,694,832.

BACKGROUND OF THE INVENTION

1. Field of the Invention

The present invention relates to an automatic bread producing machine which automatically produces bread once the given ingredients are set in the machine.

2. Description of the Prior Art

The conventional bread producing machine of this type has, in general, a structure like one shown in FIG. 24. In FIG. 24, numeral 1 denotes a chassis mounted at a bottom of a lower case 3. An upper case 2 is mounted onto the lower case 3 so as to cooperatively form a body of the bread producing machine. In the machine body, a baking chamber 4 is formed above the chassis 1. The baking chamber 4 accommodates therein a bread vessel 6 in which the given ingredients of bread are set. The bread vessel 6 is formed of die-cast aluminum. An essentially cylindrical bread vessel support 8 is provided at a bottom of the bread vessel 6.

As shown in FIG. 25, the bread vessel support 8 has fixed ribs 7 integrally formed on the lower circumference thereof for preventing rotation of the bread vessel support 8 and thus the bread vessel 6. Specifically, at a bottom of the baking chamber 4 is fixedly provided a vessel mounting support 10 of an essentially cylindrical shape which receives therein the bread vessel support 8. The vessel mounting support 10 has, on its inner circumferential wall, protruding portions 10a upon which the fixed ribs 7 of the bread vessel support 8 are arranged to abut so as to prevent rotation of the bread vessel 6 relative to the vessel mounting support 10. The bread vessel 6 has a hub opening at a center of its bottom for receiving therethrough a rotation shaft 9a. The rotation shaft 9a has one end inside the bread vessel 6 at the bottom thereof, onto which a mixing vane 9 is detachably mounted for mixing the bread ingredients put in the bread vessel 6. The rotation shaft 9a has the other end outside the bread vessel 6, onto which a driven-side connector 9b is mounted. The driven-side connector 9b engages with a driving-side connector 38b mounted onto a rotation shaft 38a of a pulley 38 which is connected to an output shaft of a motor 5 via a belt 20. Accordingly, a torque of the motor 5 is transmitted to the mixing vane 9 via the pulley 38, the driving-side connector 38b and the driven-side connector 9b. FIGS. 26A and 26B are perspective views for showing the driven-side and driving-side connectors 9b and 38b, respectively.

In the foregoing structure, when a load applied to the mixing vane 9 is increased, the driven-side connector 9b tends to run over projections, each having a triangular cross-section, of the driving-side connector 38b so that the bread vessel 6 tends to move upward. In order to prevent this upward movement of the bread vessel 6 so as to ensure the normal stable engagement between the driven-side and driving-side connectors 9b and 38b, fixing springs 11 are provided to firmly press the bread vessel 6 at an upper end thereof as shown in FIG. 27. In FIG. 27, each of the fixing springs 11 is formed of an elastic steel wire and includes a step 11a for receiving the upper end of the bread vessel 6. The fixing spring 11 has one end fixed to an inner surface of a surrounding wall of the baking chamber 4 by means of a proper mounting fixture 12, such as a screw. The fixing spring 11 has the other end protruding outward through an opening 4a formed at the surrounding wall of the baking chamber 4. Accordingly, when mounting the bread vessel 6 in the baking chamber 4, each of the fixing springs 11 first abuts against the outer periphery of the bread vessel 6 so as to deflect in a direction A. When the bread vessel 6 is placed in position, each fixing spring 11 is restored so as to receive the upper end of the bread vessel 6 at the step 11a.

Referring back to FIG. 24, a heater 14 is arranged in the baking chamber 4 for heating the bread vessel 6. A temperature sensor 15 is further arranged in the baking chamber 4 for monitoring a temperature of the bread vessel 6. Numeral 16 denotes an outer lid with an inner lid 17 for opening and closing the baking chamber 4 relative to the exterior. Numeral 18 denotes an operation panel for a user to manually set a baking time, start cooking and the like. The operation panel 18 includes a control unit for controlling energization of the motor 5 and the heater 14 based on temperature data monitored by the temperature sensor 15, time data and others so as to automatically execute processes of mixing, aging, fermenting and baking. Numeral 19 denotes a capacitor for driving the motor 5.

FIG. 28 shows another example of the conventional bread producing machine, wherein a battery, such as a coin-shaped lithium battery, is provided for backup protection of a microcomputer and maintaining a function of a clock. In FIG. 28, the same or like components are represented by the same reference numerals as those in FIG. 24.

In FIG. 28, a chassis 1 firmly holds a plate-metal body 22 of the machine at its lower end in cooperation with a bottom plate 21 in a sandwiched manner. In the machine body 22, a baking chamber 4 having a heater 14 therein is formed above the chassis 1. The baking chamber 4 accommodates therein a bread vessel 6 in which the given ingredients of bread are set. The bread vessel 6 is detachably mounted onto a vessel mounting support 10 in a sandwiched manner. A rotation shaft having an upper end mounted with a mixing vane 9 and a lower end mounted with a driven-side connector 24 is rotatably supported at the center of the bottom of the bread vessel 6. The driven-side connector 24 engages with a driving-side connector 26b mounted onto an upper end of a rotation shaft 26a which is rotatably supported by the vessel mounting support 10. The shaft 26a has a lower end mounted with a large pulley 27 which, in turn, is connected to a small pulley 28 via a belt 20. The small pulley 28 is mounted onto an output shaft of a motor which is fixed to an underside of the chassis 1. Accordingly, the mixing vane 9 is rotated by the driving torque from the motor 5. Numeral 23 denotes a lid for opening and closing the baking chamber 4 relative to the exterior.

A power supply board 29 is an electric drive circuit board for supplying power to the heater 14 and the motor 5 and fixed on the chassis 1 via a board base 30 formed of resin. A microcomputer board 31 is an electric circuit board for outputting control commands to electronic elements, such as a triac and a relay, which perform switching operations for the heater 14 and the motor 5. The microcomputer board 31 is connected to the power supply board 29 via a cable 32 and held in a receiving section 33 provided in a cover 34 of the machine. Further, the microcomputer board 31 is provided with a crystal oscillator and a liquid-crystal display for showing time and an ongoing cooking process. Numeral 35 denotes a battery board in the form of a paper phenol laminate having a coin-shaped lithium battery fixed thereon. The battery board 35 is connected to the microcomputer board 31 via leads 36 and held by a holder 37 which is fixed to the cover 34 by means of a screw. The screw is inserted through an opening formed at the cover 34.

When the machine starts to be operated with the bread ingredients put in the bread vessel 6, the microcomputer board 31 controls the operations of the heater 14 and the motor 5 so that the machine executes, in order, processes of mixing, aging and fermenting of bread dough, and then heats the inside of the baking chamber 4 up to a high temperature of 150° C.~230° C. for baking bread. The microcomputer board 31 is normally operated with power which is supplied via the plug-socket connection. On the other hand, when the plug is disconnected from the socket, power is supplied to the microcomputer board 31 from the battery board 35 for maintaining the stored data and the clock function.

In the former bread producing machine, however, in order to stably hold the bread vessel 6 in the baking chamber 4, no play is substantially provided between the bread vessel 6 and each fixing spring 11, and the pressing force of each fixing spring 11 is set to be large. This makes it difficult to set the bread vessel 6 in position against the pressing force of the fixing springs 11, and further makes it difficult to detach the bread vessel 6 from within the baking chamber 4. Accordingly, for example, such problems are likely to occur that, when mounting the bread vessel 6 with the given bread ingredients put therein, the bread ingredients spill over the bread vessel 6 due to an extreme force being applied to the bread vessel 6, and that the machine is operated while the bread vessel 6 is not properly positioned in the baking chamber 4. As a result, the bread is not well baked to waste the bread ingredients, and portions of the machine are subjected to damages due to, for example, thermal deformation. Further, for locking the bread vessel 6 relative to the vessel mounting support 10, the fixing springs 11 and the mounting fixtures 12, such as the screws, are additionally required, with the openings 4a further required at the surrounding walls of the baking chamber 4 for allowing the corresponding ends of the fixing springs 11 to pass therethrough. This increases the number of the parts of the machine and the number of the assembling processes of the machine, leading to the increased cost of the machine.

On the other hand, it is necessary to provide certain gap or play in the connection between the bread vessel support 8 and the vessel mounting support 10 for easily mounting and detaching the bread vessel 6 onto and from the vessel mounting support 10. Thus, while the mixing vane 9 is rotated and performs the mixing process to prepare the bread dough, every time the bread dough in the bread vessel 6 rolls and hits an inner wall surface of the bread vessel 6, the bread vessel support 8 along with the bread vessel 6 moves relative to the vessel mounting support 10 so that corresponding sounds are generated between the bread vessel support 8 and the vessel mounting support 10, and further creaking sounds are generated between the fixing springs 11 and the corresponding walls of the baking chamber 4. These sounds in operation are very noisy.

Further, the optimum mixing degrees of the bread dough differ depending on kinds of bread and ingredients. However, since a mixing strength provided by the mixing vane 9 can not be adjusted, the mixing degree can only be adjusted by adjusting a mixing time. This makes it difficult to achieve the optimum mixing process, and further, inevitably changes a cooking time.

Moreover, in the latter bread producing machine, when changing the battery, it is necessary that the battery board 35 be replaced entirely. This lacks handiness and leads to a high cost for changing the battery. Further, when a liquid, such as water, invades the cover 34 through the opening for mounting the holder 37, the battery board 35 is subjected to a leak due to the invaded water, thereby unable to provide the backup protection for the microcomputer and maintain the clock function.

SUMMARY OF THE INVENTION

Therefore, it is an object of the present invention to provide an improved automatic bread producing machine.

According to one aspect of the present invention, a bread producing machine comprises a baking chamber provided therein with a heater; a bread vessel provided in the baking chamber and having therein a mixing vane which rotates in one direction for mixing a bread ingredient; a bread vessel support having an essentially cylindrical shape and provided at an underside of the bread vessel in a fixed relationship thereto; a vessel mounting support for holding the bread vessel support; a motor for driving the mixing vane; and a control unit for controlling energization of the heater and the motor, wherein the bread vessel support has a plurality of stoppers provided on circumference thereof, and the vessel mounting support has recessed portions for guiding the stoppers, respectively, and engaging portions for engaging with the stoppers, respectively, wherein each of the engaging portions is provided at a side of the corresponding recessed portion located in a rotation direction of the mixing vane with respect to the corresponding recessed portion, and wherein each of the stoppers and each of the engaging portions have upper surfaces, respectively, which engage with each other during rotation of the mixing vane and each of which is in the form of an inclined surface.

It may be arranged that each of the upper surfaces is in the form of an inclined flat surface.

It may also be arranged that one of the upper surfaces is in the form of an inclined flat surface and the other of the upper surfaces is in the form of a curved surface.

According to another aspect of the present invention, a bread producing machine comprises a baking chamber provided therein with a heater; a bread vessel provided in the baking chamber and having therein a mixing vane which rotates in one direction for mixing a bread ingredient; a bread vessel support having an essentially cylindrical shape and provided at an underside of the bread vessel in a fixed relationship thereto; a vessel mounting support for holding the bread vessel support; a motor for driving the mixing vane; and a control unit for controlling energization of the heater and the motor, wherein the bread vessel support has a plurality of vertical fixed ribs provided on circumference thereof, and each of the fixed ribs has a stopper which projects in a tangential direction of the circumference of the bread vessel support, wherein the vessel mounting support has recessed portions for engaging with the fixed ribs, respectively, and engaging portions for engaging with the stoppers, respectively, and wherein each of the engaging portions is provided at a side of the corresponding recessed portion located in a rotation direction of the mixing vane with respect to the corresponding recessed portion.

According to another aspect of the present invention, a bread producing machine comprises a baking chamber provided therein with a heater; a bread vessel provided in the baking chamber and having therein a mixing vane for mixing a bread ingredient; a bread vessel support having an essentially cylindrical shape and provided at an underside of the bread vessel in a fixed relationship thereto; a vessel mounting support for holding the bread vessel support; a motor for driving the mixing vane; and a control unit for controlling energization of the heater and the motor, wherein the bread vessel support has a plurality of stoppers having different heights and provided on circumference thereof, wherein the vessel mounting support has recessed portions for guiding the stoppers, respectively, and engaging portions for engaging with the stoppers, respectively, and wherein the recessed portions have different depths corresponding to the different heights of the stoppers so as to allow the bread vessel support to be received in the vessel mounting support only in a given positional relationship thereto.

According to another aspect of the present invention, a bread producing machine comprises a baking chamber provided therein with a heater; a bread vessel provided in the baking chamber and having therein a mixing vane for mixing a bread ingredient; a bread vessel support having an essentially cylindrical shape and provided at an underside of the bread vessel in a fixed relationship thereto; a vessel mounting support for holding the bread vessel support; a motor for driving the mixing vane; and a control unit for controlling energization of the heater and the motor, wherein the bread vessel support has a plurality of stoppers having different widths and provided on circumference thereof, wherein the vessel mounting support has recessed portions for guiding the stoppers, respectively, and engaging portions for engaging with the stoppers, respectively, and wherein the recessed portions have different widths corresponding to the different widths of the stoppers so as to allow the bread vessel support to be received in the vessel mounting support only in a given positional relationship thereto.

According to another aspect of the present invention, a bread producing machine comprises a baking chamber provided therein with a heater; a bread vessel provided in the baking chamber and having therein a mixing vane for mixing a bread ingredient; a vessel mounting support for holding the bread vessel; a motor for driving the mixing vane; and a control unit for controlling energization of the heater and the motor, wherein the bread vessel has an essentially rectangular horizontal-cross section and includes a vertical rib protruding on an inner wall surface of the bread vessel, wherein the vertical rib is provided as being offset from a center of the inner wall surface in one of rotation directions of the mixing vane, and wherein the rotation direction of the mixing vane is switchable.

It may be arranged that a plurality of vertical fixed ribs are provided on circumference of an essentially cylindrical bread vessel support provided at an underside of the bread vessel in a fixed relationship thereto, and each of the fixed ribs has a stopper which projects in a tangential direction of the circumference of the bread vessel support, that half of the stoppers project in one of the rotation directions of the mixing vane and the remaining half of the stoppers project in the other of the rotation directions of the mixing vane, and that the vessel mounting support has recessed portions for engaging with the fixed ribs, respectively, and engaging portions for engaging with the stoppers, respectively.

It may also be arranged that a plurality of stoppers are provided on circumference of an essentially cylindrical bread vessel support provided at an underside of the bread vessel in a fixed relationship thereto, and the vessel mounting support has recessed portions for guiding the stoppers, respectively, and engaging portions for engaging with the stoppers, respectively, that the engaging portions are provided at both sides of each of the recessed portions with respect to the rotation direction of the mixing vane, and that an upper surface of each of the stoppers which is engageable with the corresponding engaging portion has a shape which is symmetrical.

According to another aspect of the present invention, a bread producing machine comprises a baking chamber provided therein with a heater; a bread vessel provided in the baking chamber and having therein a mixing vane which rotates in one direction for mixing a bread ingredient; a bread vessel support provided at an underside of the bread vessel in a fixed relationship thereto; a vessel mounting support for holding the bread vessel support; a motor for driving the mixing vane; a control unit for controlling energization of the heater and the motor; and a fixing member, having an asymmetric shape, for holding the bread vessel at a given upper portion only at one side of the given upper portion located in the rotation direction of the mixing vane.

According to another aspect of the present invention, a bread producing machine comprises a mounting body accommodating therein a control unit; a battery for supplying electric power to the control unit; and a battery holder mounted with the battery, wherein the mounting body has an opening and the battery holder along with the battery is mounted into the mounting body through the opening.

It may be arranged that a given rim portion of the battery holder is so extended as to hit a rim of the opening when the battery holder is inserted into the opening reversely, whereby the battery holder is unable to be inserted to a given normal mounting position.

It may also be arranged that the battery holder is mounted and detached relative to the mounting body with an essentially linear motion through the opening, and that the battery holder is held by an internal structure of the mounting body at the opening and further held at the opening by means of a stopper provided on the battery holder.

It may also be arranged that the holding of the battery holder by means of the stopper is released by a force which is orthogonal to mounting and detaching directions of the battery holder relative to the mounting body.

According to another aspect of the present invention, a bread producing machine comprises a control circuit for controlling bread producing processes; a receiving section for holding the control circuit; a cover for accommodating therein the receiving section; a battery for supplying electric power to the control circuit; and a battery holder for mounting the battery thereon, wherein the cover has an opening and the battery holder is mounted and detached relative to the cover through the opening, and wherein the battery holder is held between the receiving section and the cover.

It may be arranged that battery terminals are provided for connection between the battery and the control circuit and each of the battery terminals have a cut-turnover portion, that ribs each having a fitting portion and bosses are disposed on an outer periphery of the receiving section, and that each of the battery terminals is held between the bosses and the cut-turnover portion of each battery terminal is fitted into the fitting portion of the rib so that the battery terminals are fixed relative to the receiving section.

It may also be arranged that positive and negative terminals are provided for contacting positive and negative electrodes of the battery and for connection to the control circuit, and each of the positive and negative terminals have an essentially [-shape, and that the positive and negative terminals are arranged at an angle of 60° to 120° therebetween.

It may also be arranged that a chassis is provided for mounting thereon a baking chamber and a drive circuit board, the cover being arranged above the drive circuit board, and that a water receptacle is further provided between the cover and the drive circuit board and just below the opening.

BRIEF DESCRIPTION OF THE DRAWINGS

The present invention will be understood more fully from the detailed description given hereinbelow, taken in conjunction with the accompanying drawings.

In the drawings:

FIGS. 4A and 4B are diagrams for explaining a positional relationship between the bread vessel support and the vessel mounting support when the vessel unit is locked relative to the vessel mounting support, according to the first preferred embodiment, wherein FIG. 4A is a plan view of the bread vessel support with a bread vessel of the vessel unit shown by imaginary lines and FIG. 4B is a plan view of the vessel mounting support;

FIGS. 9A and 9B are diagrams for explaining a positional relationship between a bread vessel support and a vessel mounting support when a vessel unit is locked relative to the vessel mounting support, according to a fourth preferred embodiment of the present invention, wherein FIG. 9A is a plan view of the bread vessel support with a bread vessel of the vessel unit shown by imaginary lines and FIG. 9B is a plan view of the vessel mounting support;

FIGS. 10A and 10B are diagrams for explaining a positional relationship between a bread vessel support and a vessel mounting support when a vessel unit is locked relative to the vessel mounting support, according to a fifth preferred embodiment of the present invention, wherein FIG. 10A is a plan view of the bread vessel support with a bread vessel of the vessel unit shown by imaginary lines and FIG. 10B is a plan view of the vessel mounting support;

FIGS. 12A and 12B are diagrams for explaining a positional relationship between a bread vessel support of the vessel unit and the vessel mounting support when the vessel unit is locked relative to the vessel mounting support, according to the sixth preferred embodiment, wherein FIG. 12A is a plan view of the bread vessel support with a bread vessel of the vessel unit shown by imaginary lines and FIG. 12B is a plan view of the vessel mounting support;

FIGS. 19A and 19B are diagrams, respectively, for explaining mounting and detaching operations of a battery holder relative to the cover according to the ninth preferred embodiment;

FIG. 20A is a front view showing the battery holder;

FIG. 20B is a sectional view taken along line a—a in FIG. 20A;

FIG. 21 is a diagram for showing a mounting structure of a battery terminal of the battery holder according to the ninth preferred embodiment;

FIGS. 26A and 26B are perspective views for showing a driven-side connector and a driving-side connector, respectively, which are incorporated in the conventional bread producing machine shown in FIG. 24;

FIG. 27 is a partial sectional view of the conventional bread producing machine shown in FIG. 24 for showing a mechanism for preventing an upward movement of a bread vessel.

DESCRIPTION OF THE PREFERRED EMBODIMENT

Figure 1:
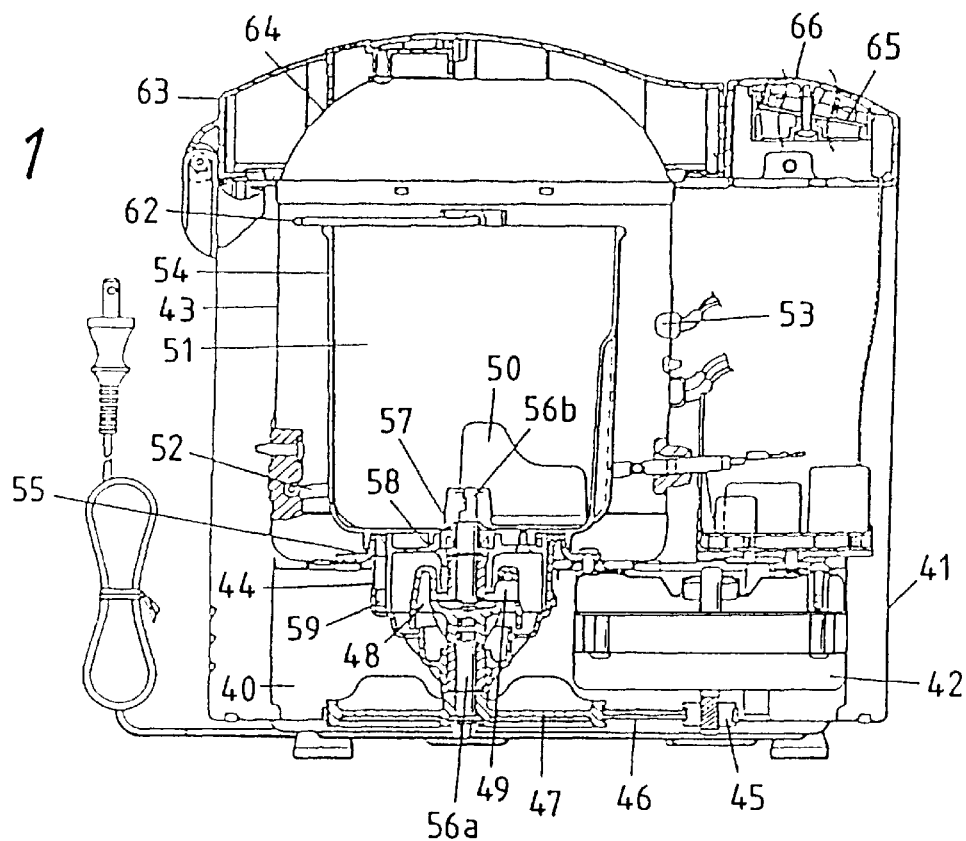
FIG. 1 is a vertical sectional view of a bread producing machine according to a first preferred embodiment of the present invention.

Now, preferred embodiments of the present invention will be described hereinbelow with reference to the accompanying drawings.

First Embodiment

A first preferred embodiment of the present invention will be described with reference to FIGS. 1 to 4.

In FIGS. 1 to 4, numeral 40 denotes a chassis on which a plate-metal body 41, a motor 42, a baking chamber 43 and a vessel mounting support 44 are mounted. Rotation of the motor 42 is transmitted, via a small pulley 45 and a belt 46, to a large pulley 47 and further to a driving-side connector 48. The large pulley 47 and the driving-side connector 48 are both mounted on a rotation shaft 56a which is rotatably supported by the vessel mounting support 44 via a bearing.

In the baking chamber 43, a bread vessel 54 formed of diecast aluminum is mounted for receiving bread ingredients therein.

The bread vessel 54 is provided at its underside with a bread vessel support 55 which is also formed of die-cast aluminum. The bread vessel 54 and the bread vessel support 55 are separate members which are fixed to each other to form a vessel unit 51. A further rotation shaft 56b extends through the bread vessel support 55 and is rotatably supported by a bearing 58. Numeral 57 denotes an oil seal for sealing around the rotation shaft 56b. The rotation shaft 56b has one end inside the bread vessel 54 at a bottom thereof, onto which a mixing vane 50 is detachably mounted. The rotation shaft 56b has the other end outside the bread vessel 54, onto which a driven-side connector 49 is mounted. The driven-side connector 49 engages with the driving-side connector 48. Accordingly, the rotation of the motor 42 transmitted to the driving-side connector 48 as described above is finally transmitted to the mixing vane 50 via the driven-side connector 49 and the rotation shaft 56b for enabling the mixing vane 50 to mix the bread ingredients put in the bread vessel 54. In the baking chamber 43 are further provided a heater 52 for heating the bread vessel 54 and a temperature sensor 53 for monitoring a temperature in the baking chamber 43.

Figure 2:
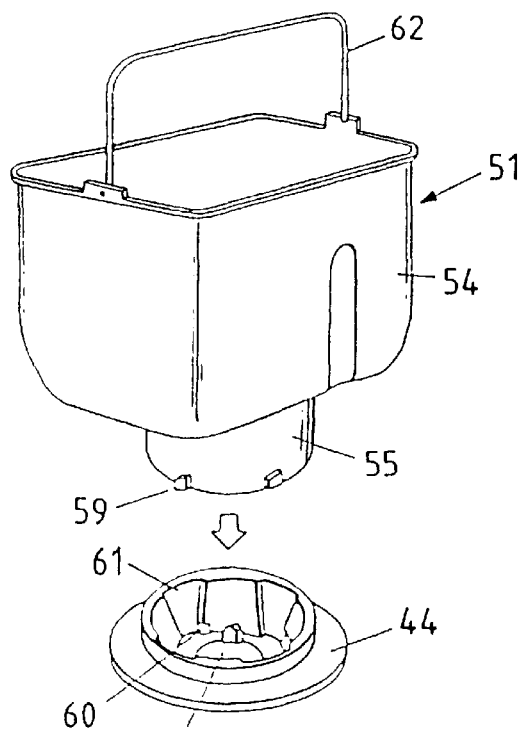
FIG. 2 is a diagram for explaining a mounting operation of a vessel unit onto a vessel mounting support according to the first preferred embodiment.
Figure 3:
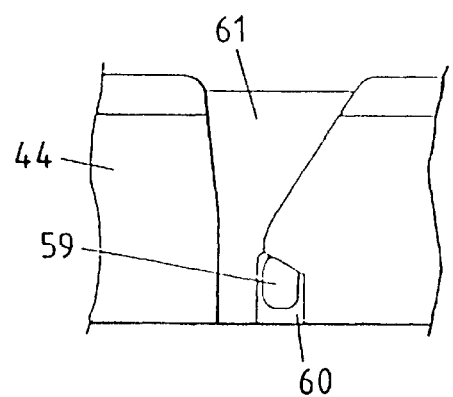
FIG. 3 is a diagram for showing an engaging state between a stopper of a bread vessel support of the vessel unit and a cutout of the vessel mounting support when the vessel unit is locked relative to the vessel mounting support, according to the first preferred embodiment.

The bread vessel support 55 has a tapered cylindrical shape and an inner surface of the circumferential wall of the vessel mounting support 44 has a corresponding tapered shape for facilitating fitting of the bread vessel support 55 into the vessel mounting support 44. The bread vessel support 55 has a plurality of (four in this embodiment) stoppers 59 integrally formed on the lower circumference thereof. As shown in FIGS. 2 and 3, the vessel mounting support 44 has a plurality of (four in this embodiment) cutouts 60 at its circumferential wall for receiving and firmly holding the stoppers 59 of the bread vessel support 55, respectively. Tapered recessed portions 61 are further formed on the inner surface of the circumferential wall of the vessel mounting support 44 for guiding the stoppers 59 to positions adjacent to the corresponding cutouts 60, respectively. Each of the cutouts 60 is provided adjacent to a tapered lower end of the corresponding recessed portion 61 and at one side of the corresponding recessed portion 61 located in a rotation direction of the mixing vane 50 with respect to the recessed portion 61. Each of the cutouts 60 has an upper wall surface which is flat and inclined downward from the recessed portion 61 in the rotation direction of the mixing vane 50.

Each of the stoppers 59 also has an inclined flat upper surface for matching the inclined flat upper surface of the corresponding cutout 60. Accordingly, as seen in FIG. 3, when the stopper 59 is received in the corresponding cutout 60, their upper surfaces come in contact with each other. As further appreciated from FIG. 3, since entrance sides of each recessed portion 61 and each cutout 60 are set large, each stopper 59 can be easily received in and guided by the recessed portion 61 and further easily received in the cutout 60. Further, since a size of the stopper 59 is set notably smaller than the cutout 60, the stopper 59 can be easily released from the cutout 60.

Numeral 62 denotes a handhold which is pivotally mounted on an upper side of the bread vessel 54, and numeral 63 an outer lid with an inner lid 64 for opening and closing the baking chamber 43 relative to the exterior. Numeral 66 denotes an operation panel for a user to manually set a menu and a baking time, start cooking and the like. The operation panel 66 includes a control unit 65 for controlling energization of the motor 42 and the heater 52 based on temperature data monitored by the temperature sensor 53, time data and others so as to automatically execute processes of mixing, aging, fermenting and baking.

Now, how to set the vessel unit 51 in the baking chamber 43 will be described hereinbelow.

First, as shown in FIG. 2, when the vessel unit 51 with the bread ingredients set in the bread vessel 54 is lowered in the baking chamber 43, the stoppers 59 of the bread vessel support 55 are received in the corresponding tapered recessed portions 61 from the enlarged entrance sides thereof and guided by the recessed portions 61 due to weight of the vessel unit 51. The vessel unit 51 is lowered until a lower end of the bread vessel support 55 abuts upon a stepped bottom (see FIG. 1) of the vessel mounting support 44 so that each stopper 59 is located adjacent to the entrance side of the corresponding cutout 60.

Subsequently, when the operation panel 66 is manually operated to start the mixing process, since the upper contacting or engaging surfaces of each of the stoppers 59 and each of the cutouts 60 are in the form of the flat surfaces each inclining downward in the rotation direction of the mixing vane 50 and each stopper 59 is notably smaller than the cutout 60, the vessel unit 51 is easily turned in a locking direction, that is, in the rotation direction of the mixing vane 50, due to resistance caused upon hitting of the bread ingredients against an inner surface of the bread vessel 54. Thus, as shown in FIG. 3, each stopper 59 is automatically received and locked in position in the corresponding cutout 60 and thus the vessel unit 51 is automatically fixed relative to the vessel mounting support 44.

As appreciated, the vessel unit 51 can also be fixed to the vessel mounting support 44 by holding the handhold 62 and turning it in the locking direction.

Since mixing and degassing of the bread dough are performed by rotating the mixing vane 50 only in one direction and thus the vessel unit 51 is exerted with torque only in the locking direction, each of the stoppers 59 is prevented from being released from within the corresponding cutout 60. Further, as appreciated, the vessel unit 51 can be easily detached from the vessel mounting support 44 by holding the handhold 62 and then turning it in an unlocking direction which is opposite to the foregoing locking direction. Further, since the upper engaging surfaces of each of the stoppers 59 and each of the cutouts 60 are in the form of the flat surfaces each inclining downward in the locking direction, when the mixing process of the bread ingredients starts, a component of torque during the mixing process is applied to the upper contacting surface of each stopper 59 in a direction to urge the vessel unit 51 downward. Accordingly, the vessel unit 51 can be locked relative to the vessel mounting support 44 more reliably as compared with the foregoing former bread producing machine where the bread vessel is simply pressed by the force of the fixing springs. Further, the noisy operation sounds during the mixing process can be largely reduced.

As described above, according to the foregoing first preferred embodiment, the vessel unit 51 is automatically fixed relative to the vessel mounting support 44 while being biased downward due to weight of the vessel unit 51 and the rotation force of the mixing vane 50, that is, the driving force of the motor 42. Accordingly, the mounting and detaching operations of the vessel unit 51 are largely improved so that the problems, such as the failure in cooking and the damages to the parts of the machine, which would have been otherwise caused, can be effectively prevented. Further, as described above, the noisy operation sounds during the mixing process can be greatly reduced. Moreover, since the vessel unit 51 can be locked relative to the vessel mounting support 44 only by means of the engagement between the bread vessel support 55 and the vessel mounting support 44, the additional parts, such as the fixing springs and the mounting screws, which were conventionally required, can be omitted to reduce the number of the parts of the machine and the number of the assembling processes of the machine, leading to reduction in cost of the machine.

Figure 4A:
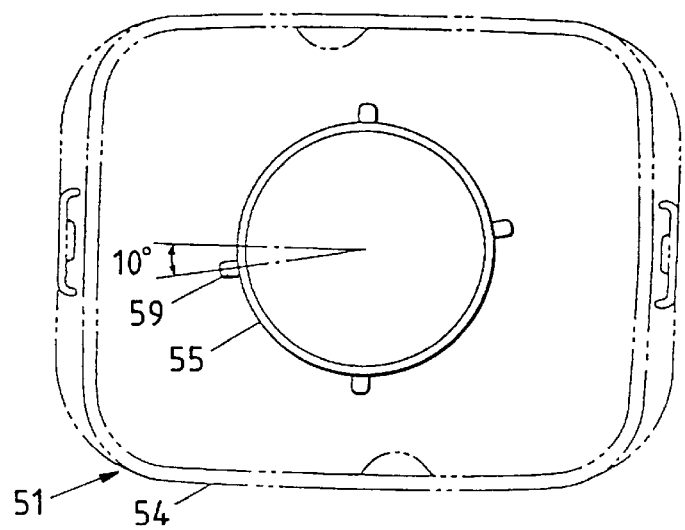

As shown in FIG. 4A, an angular arrangement of the stoppers 59 is not uniform. Specifically, two of the stoppers 59, that is, the right and left stoppers 59 in FIG. 4A, are arranged as being offset by 10° relative to a uniform angular arrangement thereof. As appreciated from FIG. 4B, angular arrangements of the recessed portions 61 and thus the cutouts 60 are also offset by 10° relative to uniform angular arrangements thereof, respectively, corresponding to the offset arrangement of the stoppers 59. Accordingly, the vessel unit 51 can be mounted on the vessel mounting support 44 only in a given positional relationship thereto so as to ensure prevention of a mounting error of the vessel unit 51.

Second Embodiment

Now, a second preferred embodiment of the present invention will be described hereinbelow.

The second preferred embodiment differs from the foregoing first preferred embodiment only in a configuration of the upper engaging surface of each of the cutouts of the vessel mounting support. The other structure is the same as that in the first preferred embodiment.

Figure 5:
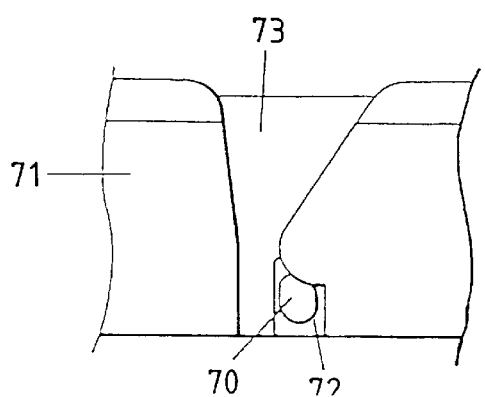
FIG. 5 is a diagram for showing an engaging state between a stopper of a bread vessel support of a vessel unit and a cutout of a vessel mounting support when the vessel unit is locked relative to the vessel mounting support, according to a second preferred embodiment of the present invention.

In FIG. 5, numeral 70 denotes one of four stoppers, corresponding to the stoppers 59, of a bread vessel support corresponding to the bread vessel support 55, of a vessel unit corresponding to the vessel unit 51. Like the stoppers 59, each of the stoppers 70 has a flat upper engaging surface which is inclined downward in the foregoing locking direction. Numeral 71 denotes a vessel mounting support corresponding to the vessel mounting support 44, numeral 72 denotes one of four cutouts corresponding to the cutouts 60, and numeral 73 denotes one of four recessed portions corresponding to the recessed portions 61. In this embodiment, each of the cutouts 72 has an upper engaging surface in the form of a curved surface which is convex downward, so as to provide a point contact between the upper surfaces of the stopper 70 and the cutout 72 rather than a surface contact between the stopper 59 and the cutout 60 as in the first preferred embodiment.

Figure 6:
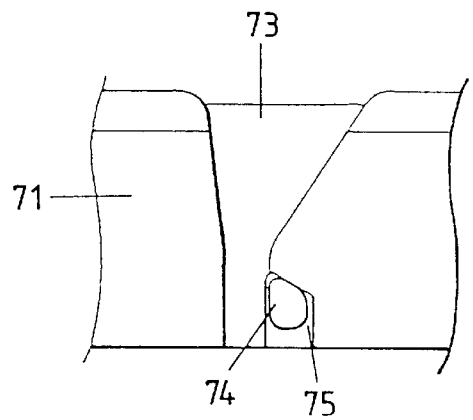
FIG. 6 is a diagram for showing an engaging state between a stopper of a bread vessel support of a vessel unit and a cutout of a vessel mounting support when the vessel unit is locked relative to the vessel mounting support, according to a modification of the second preferred embodiment.

FIG. 6 shows a modification of the foregoing second preferred embodiment. In this modification, each of cutouts 75 corresponding to the cutouts 72 has a flat upper engaging surface which is inclined downward in the foregoing locking direction while each of stoppers 74 corresponding to the stoppers 70 has an upper engaging surface in the form of a curved surface which is convex upward, so as to provide a point contact between the upper surfaces of the stopper 74 and the cutout 75. The other structure is the same as that in the foregoing second preferred embodiment.

The second preferred embodiment and its modification both work essentially in the same manner as the foregoing first preferred embodiment so as to automatically lock the vessel unit relative to the vessel mounting support. In addition, as shown in FIGS. 5 and 6, since the engagement between the upper surface of each stopper and the upper surface of the corresponding cutout is in the form of the point contact, even when unevenness is caused in flatness, angle and the like among the upper surfaces of the produced stoppers and cutouts, the vessel unit can be fixed relative to the vessel mounting support more reliably as compared with the first preferred embodiment which provides the surface contact between the upper surfaces of each stopper and cutout. Accordingly, in the second preferred embodiment and its modification, in addition to the foregoing advantages provided in the first preferred embodiment, an allowable range of such unevenness among the upper surfaces of the stoppers and cutouts can be increased.

Third Embodiment

Now, a third preferred embodiment of the present invention will be described hereinbelow.

Figure 7:
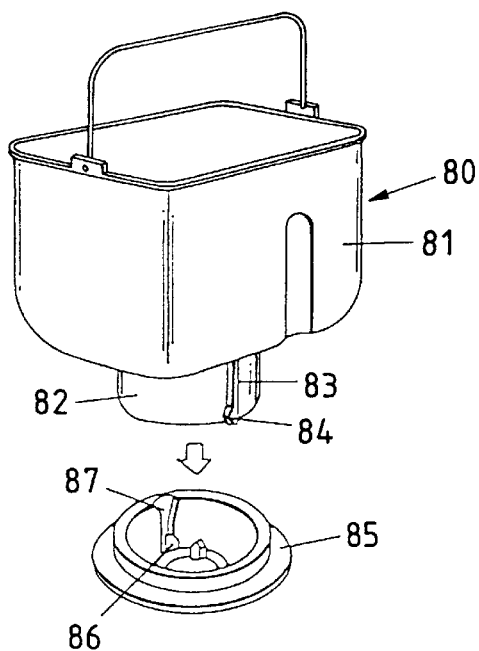
FIG. 7 is a diagram for explaining a mounting operation of a vessel unit onto a vessel mounting support according to a third preferred embodiment of the present invention.
Figure 8:
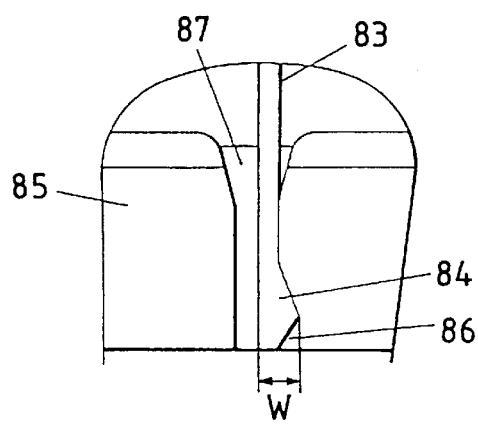
FIG. 8 is a diagram for showing an engaging state between a stopper of a bread vessel support of the vessel unit and a cutout of the vessel mounting support when the vessel unit is locked relative to the vessel mounting support, according to the third preferred embodiment.

In FIGS. 7 and 8, numeral 80 denotes a vessel unit including a bread vessel 81 where the bread ingredients are set and a bread vessel support 82 having a tapered cylindrical shape. A plurality of fixed ribs 83 (only one of which is shown in FIG. 7) are provided on the circumference of the bread vessel support 82. Each rib 83 is in the form of an elongate member and extends vertically. Each rib 83 is formed at its lower end with a stopper 84 which projects in a tangential direction of the circumference of the bread vessel support 82 and has a mountaintop-like tip. The stopper 84 has a flat upper engaging surface which inclines downward to the tip in the foregoing locking direction or in the foregoing rotation direction of the mixing vane 50 (see FIG. 1). The stopper 84 has a lower end having a width which is smaller than a width of the fixed rib 83. Numeral 85 denotes a vessel mounting support on which the bread vessel support 82 is mounted. The vessel mounting support 85 has a plurality of cutouts 86 at its circumferential wall for receiving and firmly holding the stoppers 84 of the bread vessel support 82, respectively. Tapered recessed portions 87 (only one of which is shown in FIG. 7) are further formed on an inner surface of the circumferential wall of the vessel mounting support 85 for guiding the stoppers 84 to positions adjacent to the corresponding cutouts 86, respectively. Each of the cutouts 86 is provided adjacent to a lower end of the corresponding recessed portion 87 and at one side of the corresponding recessed portion 87 located in the rotation direction of the mixing vane 50 with respect to the recessed portion 87. Each of the cutouts 86 has an upper wall surface which is flat and inclined downward from the recessed portion 87 in the rotation direction of the mixing vane 50 so as to match the inclined flat upper surface of the corresponding stopper 84. Accordingly, as seen in FIG. 8, when the stopper 84 is received in the corresponding cutout 86, their upper surfaces come in engagement with each other. As further appreciated from FIG. 8, since entrance sides of each recessed portion 87 and each cutout 86 are set large, each stopper 84 can be easily received in and guided by the recessed portion 87 and further easily received in the cutout 86.

The other structure is the same as that in the foregoing first preferred embodiment.

Now, how to set the vessel unit 80 in the baking chamber 43 (see FIG. 1) will be described hereinbelow.

In FIG. 8, a width W of each stopper 84 is set to a value such that, when the vessel unit 80 is raised vertically in the state of FIG. 8 where each stopper 84 fully engages the corresponding cutout 86, the stopper 84 slides on the upper surface of the cutout 86 to allow corresponding rotation of the vessel unit 80. By setting the width W to such a value, the vessel unit 80 can be removed from the vessel mounting support 85 simply by raising the vessel unit 80 vertically. that is, without intentionally turning the vessel unit 80 in the foregoing unlocking direction or in a direction opposite to the foregoing rotation direction of the mixing vane 50.

As in the foregoing first preferred embodiment, when the mixing process is started with the bread ingredients set in the bread vessel 81, the inclined upper surfaces of the stoppers 84 and the cutouts 86 automatically come into engagement with each other as shown in FIG. 8 so that the vessel unit 80 is urged downward and locked relative to the vessel mounting support 85 in the vertical direction. Simultaneously, the vessel unit 80 is also locked relative to the vessel mounting support 85 in the rotational direction due to the engagement between the fixed ribs 83 and the wall surfaces of the corresponding recessed portions 87.

Figure 4B:
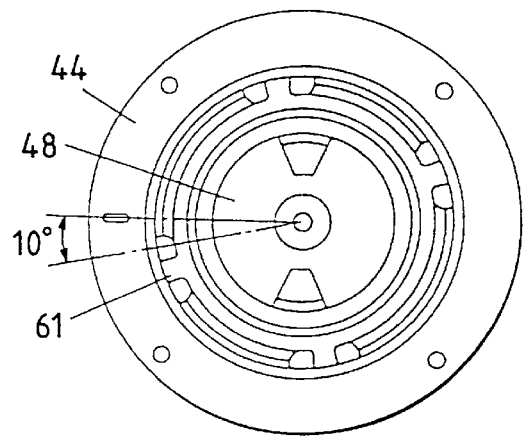

As appreciated, the offset arrangement shown in FIGS. 4A and 4B may also apply to the fixed ribs 83 with the stoppers 84, the cutouts 86 and the recessed portions 87.

As described above, according to the third preferred embodiment, like in the foregoing first preferred embodiment, the noisy operation sounds during the mixing process can be greatly reduced, and further, the number of the parts of the machine and the number of the assembling processes of the machine can be diminished to achieve reduction in cost of the machine. Moreover, the mounting and detaching operations of the vessel unit 80 relative to the vessel mounting support 85 can be greatly improved in the foregoing third preferred embodiment.

Fourth Embodiment

Now, a fourth preferred embodiment of the present invention will be described hereinbelow.

Figure 9A:
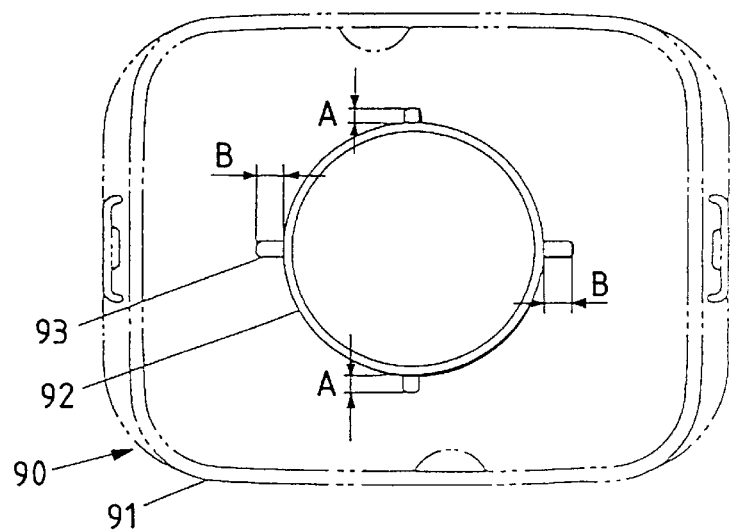
Figure 9B:
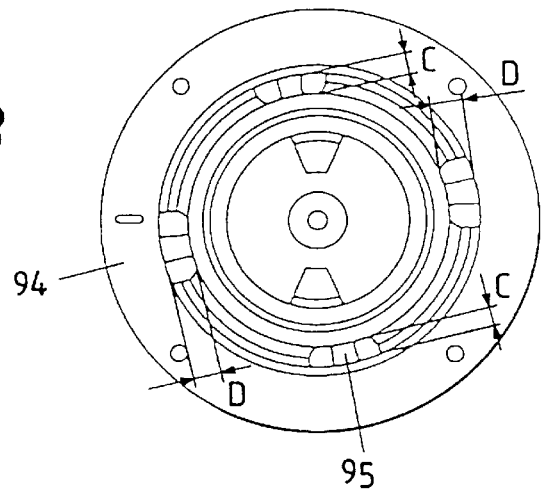

In FIGS. 9A and 9B, numeral 90 denotes a vessel unit including a bread vessel 91 and a bread vessel support 92. Four stoppers 93 are formed on the lower circumference of the bread vessel support 92 at uniform angular intervals. On the other hand, a height of each stopper 93 is set to be different from heights of the adjacent stoppers 93, while equal to a height of the opposite stopper 93.

Specifically, each of the two stoppers 93 arranged at an interval of 180° has a height A, while each of the remaining two stoppers 93 arranged at an interval of 180° has a height B. Numeral 94 denotes a vessel mounting support on which the bread vessel support 92 is mounted. The vessel mounting support 94 has a plurality of cutouts at its circumferential wall for receiving and firmly holding the stoppers 93 of the bread vessel support 92, respectively. Recessed portions 95 are further formed on an inner surface of the circumferential wall of the vessel mounting support 94 for guiding the stoppers 93 to positions adjacent to the corresponding cutouts, respectively. Like the stoppers 93, a depth of each recessed portion 95 is set to be different from depths of the adjacent recessed portions 95, while equal to a depth of the opposite recessed portion 95. Specifically, each of the two recessed portions 95 arranged at an interval of 180° has a depth C, while each of the remaining two recessed portions 95 arranged at an interval of 180° has a depth D. In FIGS. 9A and 9B, A<C<B<D is established.

The other structure is the same as that in the foregoing first preferred embodiment.

Since the four stoppers 93 are arranged at uniform angular intervals as described above, the vessel unit 90 can be fixed to the vessel mounting support 94 more stably as compared with the offset arrangement, shown in FIGS. 4A and 4B, for preventing the mounting error of the vessel unit 51. Further, since the heights of the stoppers 93 and the depths of the recessed portions 95 are set in the foregoing manner, if the user tries to mount the vessel unit 90 onto the vessel mounting support 94 in a wrong positional relationship thereto, the lower ends of the two stoppers 93 having the height B abut against the upper end of the vessel mounting support 94. Thus, the vessel unit 90 can be mounted only in the given positional relationship to the vessel mounting support 94.

As appreciated, the fourth preferred embodiment works essentially in the same manner as the foregoing first preferred embodiment so as to automatically lock the vessel unit relative to the vessel mounting support. Further, in the fourth preferred embodiment, the vessel unit can be fixed to the vessel mounting support more stably, with the mounting error of the vessel unit being effectively prevented.

Fifth Embodiment

Now, a fifth preferred embodiment of the present invention will be described hereinbelow.

Figure 10A:
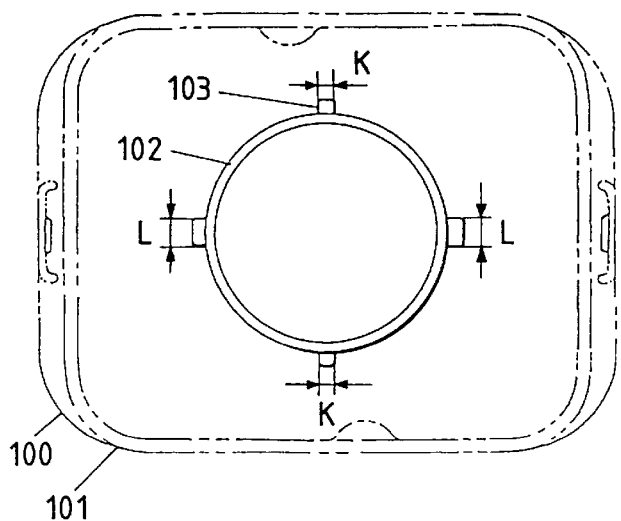
Figure 10B:
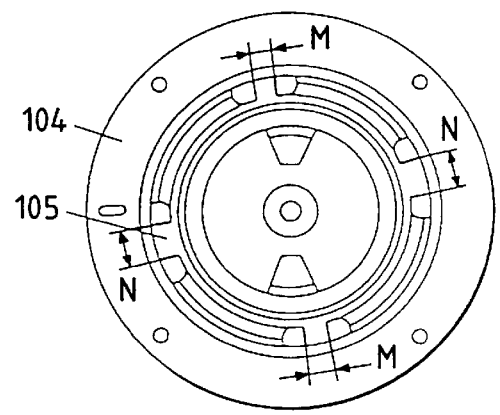

In FIGS. 10A and 10B, numeral 100 denotes a vessel unit including a bread vessel 101 and a bread vessel support 102. Four stoppers 103 are formed on the lower circumference of the bread vessel support 102 at uniform angular intervals. On the other hand, a width of each stopper 103 is set to be different from widths of the adjacent stoppers 103, while equal to a width of the opposite stopper 103. Specifically, each of the two stoppers 103 arranged at an interval of 180° has a width K, while each of the remaining two stoppers 103 arranged at an interval of 180° has a width L. Numeral 104 denotes a vessel mounting support on which the bread vessel support 102 is mounted. The vessel mounting support 104 has a plurality of cutouts at its circumferential wall for receiving and firmly holding the stoppers 103 of the bread vessel support 102, respectively. Recessed portions 105 are further formed on an inner surface of the circumferential wall of the vessel mounting support 104 for guiding the stoppers 103 to positions adjacent to the corresponding cutouts, respectively. Like the stoppers 103, a width of each recessed portion 105 is set to be different from widths of the adjacent recessed portions 105, while equal to a width of the opposite recessed portion 105. Specifically, each of the two recessed portions 105 arranged at an interval of 180° has a width C, while each of the remaining two recessed portions 105 arranged at an interval of 180° has a width D. In FIGS. 10A and 10B, K<M<L<N is established.

The other structure is the same as that in the foregoing first preferred embodiment.

Since the four stoppers 103 are arranged at uniform angular intervals as described above, the vessel unit 100 can be fixed to the vessel mounting support 104 more stably as compared with the offset arrangement shown in FIGS. 4A and 4B. Further, since the widths of the stoppers 103 and the widths of the recessed portions 105 are set in the foregoing manner, if the user tries to mount the vessel unit 100 onto the vessel mounting support 104 in a wrong positional relationship thereto, the lower ends of the two stoppers 103 having the width L abut against the upper end of the vessel mounting support 104. Thus, the vessel unit 100 can be mounted only in the given positional relationship to the vessel mounting support 104.

As appreciated, the fifth preferred embodiment works essentially in the same manner as the foregoing fourth preferred embodiment.

Sixth Embodiment

Now, a sixth preferred embodiment of the present invention will be described hereinbelow.

Figure 11:
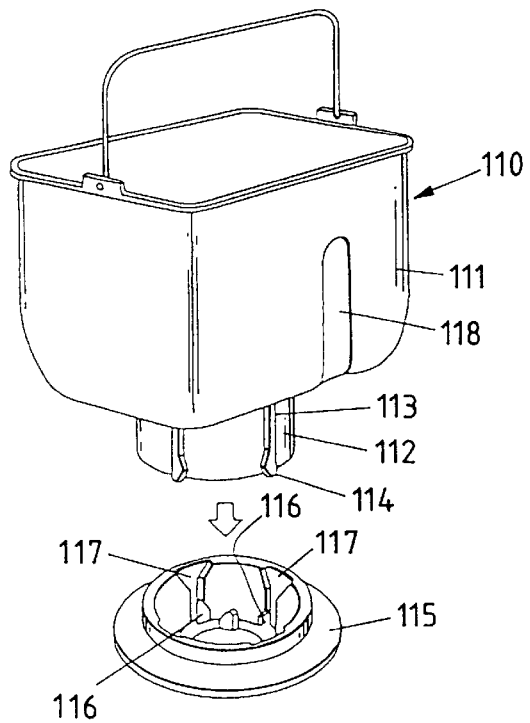
FIG. 11 is a diagram for explaining a mounting operation of a vessel unit onto a vessel mounting support according to a sixth preferred embodiment of the present invention.
Figure 12A:
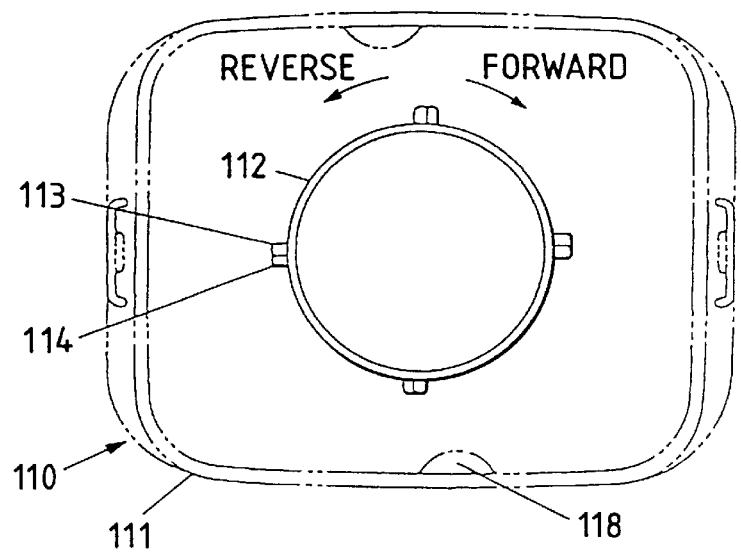
Figure 12B:
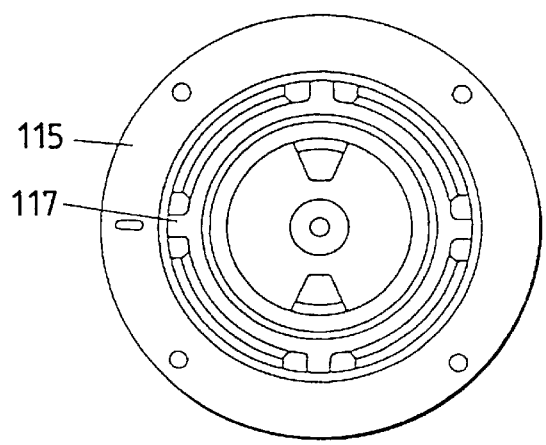

In FIGS. 11, 12A and 12B, numeral 110 denotes a vessel unit including a bread vessel 111 having an essentially rectangular horizontal-cross section and a bread vessel support 112 having a cylindrical shape. A plurality of fixed ribs 113 are provided on the circumference of the bread vessel support 112. Each rib 113 is in the form of an elongate member and extends vertically. Each rib 113 is formed at its lower end with a stopper 114 which projects in a tangential direction of the circumference of the bread vessel support 112 and has a mountaintop-like tip. Half of the stoppers 114 project in a normal or forward rotation direction (clockwise direction in FIGS. 11, 12A and 12B) of the mixing vane 50 (see FIG. 1), respectively. On the other hand, the remaining half of the stoppers 114 project in a reverse rotation direction (counterclockwise direction in FIGS. 11, 12A and 12B) of the mixing vane 50, respectively. Each stopper 114 has a flat upper engaging surface which inclines downward to the tip. Each of the flat upper engaging surfaces of the foregoing former half of the stoppers 114 inclines downward to the tip in the forward rotation direction of the mixing vane 50. On the other hand, each of the flat upper engaging surfaces of the remaining half of the stoppers 114 inclines downward to the tip in the reverse rotation direction of the mixing vane 50. In this embodiment, the stoppers 114 which project in the forward and reverse rotation directions are alternately arranged around the circumference of the bread vessel support 112. Numeral 115 denotes a vessel mounting support on which the bread vessel support 112 is mounted. The vessel mounting support 115 has a plurality of cutouts 116 at its circumferential wall for receiving and firmly holding the stoppers 114 of the bread vessel support 112, respectively. Recessed portions 117 are further formed on an inner surface of the circumferential wall of the vessel mounting support 115 for guiding the stoppers 114 to positions adjacent to the corresponding cutouts 116, respectively. Half of the cutouts 116 are arranged such that each of them is provided at one side of the corresponding recessed portion 117 located in the forward rotation direction of the mixing vane 50 with respect to the recessed portion 117, while the remaining half of the cutouts 116 are arranged such that each of them is provided at one side of the corresponding recessed portion 117 located in the reverse rotation direction of the mixing vane 50 with respect to the recessed portion 117. This arrangement of the cutouts 116 corresponds to the foregoing arrangement of the stoppers 114. Each of the cutouts 116 has an upper wall surface which is flat and inclined downward from the recessed portion 117 so as to match the inclined flat upper surface of the corresponding stopper 114. Vertical ribs 118 are further provided to project on inner surfaces of the longitudinal walls of the bread vessel 111, respectively. Each rib 118 is provided as being offset from the center of the longitudinal wall of the bread vessel 111 in the reverse rotation direction of the mixing vane 50. In this embodiment, the rotation direction of the mixing vane 50 can be switched manually. Accordingly, the user may switch the rotation direction of the mixing vane 50 depending on a kind of bread or ingredient.

The other structure is the same as that in the foregoing third preferred embodiment.

Now, an operation of the bread producing machine having the foregoing structure will be described hereinbelow.

As in the foregoing third preferred embodiment, when the vessel unit 110 is raised vertically in the state where the vessel unit 110 is locked relative to the vessel mounting support 115, the stoppers 114 slide on the corresponding upper surface of the cutout 116 to allow corresponding rotation of the vessel unit 110. Accordingly, the vessel unit 110 can be removed from the vessel mounting support 115 simply by raising the vessel unit 110 vertically, that is, without intentionally turning the vessel unit 110 in its unlocking direction.

When the mixing process is started with the bread ingredients set in the bread vessel 111, the inclined upper surfaces of half of the stoppers 114 and the corresponding half of the cutouts 116 automatically come into engagement with each other according to the rotation direction of the mixing vane 50 so that the vessel unit 110 is urged downward and locked relative to the vessel mounting support 115 in the vertical direction. Simultaneously, the vessel unit 110 is also locked relative to the vessel mounting support 115 in the rotational direction due to the engagement between the fixed ribs 113 and the wall surfaces of the corresponding recessed portions 117. Further, since the stoppers 114 are arranged to project in the forward and reverse rotation directions of the mixing vane 50 as described above and the cutouts 116 are arranged correspondingly, the vessel unit 110 can be reliably fixed to the vessel mounting support 115 irrespective of the rotation direction of the mixing vane 50, that is, whether the mixing vane 50 rotates in the forward or reverse direction.

Further, since each of the ribs 118 is disposed as being offset from the center of the longitudinal wall of the bread vessel 111 in the reverse rotation direction of the mixing vane 50, the bread dough is more liable to hit the ribs 118 during the forward rotation of the mixing vane 50 than during the reverse rotation of the mixing vane 50. Accordingly, during the forward rotation of the mixing vane 50, the bread dough tends to stay in the corner of the bread vessel 111 just before the rib 118 so that the bread dough can be mixed to higher degrees than during the reverse rotation of the mixing vane where the bread dough tends to co-rotate with the mixing vane 50. Thus, by switching the rotation direction of the mixing vane 50 to adjust the mixing strength, the high-quality bread dough can be mixed up. For example, when mixing the strong flour having a high gluten content, the mixing vane is rotated in the forward direction to mix the bread dough with higher mixing strength. On the other hand, when mixing the wheatmeal having a low gluten content with high oxygen activation to inhibit generation of gluten or the wheatmeal mixed with miscellaneous grains, such as cereals, the mixing vane is rotated in the reverse direction to mix the bread dough with less mixing strength.

As appreciated from the foregoing description, in this embodiment, by switching the rotation direction of the mixing vane, the mixing strength can be adjusted so that the optimum mixing degree of the bread dough can be achieved depending on a kind of bread or ingredient. Further, advantages like those in the foregoing third preferred embodiment can be achieved irrespective of whether the mixing vane rotates in the forward or reverse direction.

Seventh Embodiment

Now, a seventh preferred embodiment of the present invention will be described hereinbelow.

Figure 13:
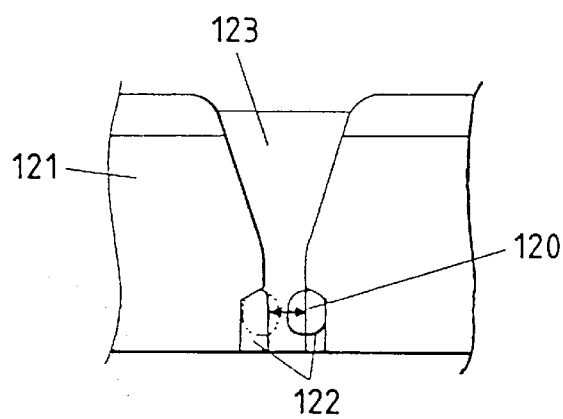
FIG. 13 is a diagram for showing an engaging state between a stopper of a bread vessel support of a vessel unit and a cutout of a vessel mounting support when the vessel unit is locked relative to the vessel mounting support, according to a seventh preferred embodiment of the present invention.

In FIG. 13, numeral 120 denotes one of four stoppers, corresponding to the stoppers 59 (see FIGS. 2 and 3), of a bread vessel support corresponding to the bread vessel support 55, of a vessel unit corresponding to the vessel unit 51. Each of the stoppers 120 has an upper engaging surface in the form of a curved surface which is convex upward and symmetrical with respect to a straight line passing the center of the upper engaging surface of the stopper 120 laterally. Accordingly, the upper engaging surface of the stopper 120 inclines downward both in the forward and reverse rotation directions from the foregoing straight lateral center line. Numeral 121 denotes a vessel mounting support corresponding to the vessel mounting support 44, and numeral 123 denotes one of four recessed portions corresponding to the recessed portions 61. In this embodiment, a pair of cutouts 122 are provided at both sides of each recessed portion 123, that is, both in the forward and reverse rotation directions of the mixing vane 50 with respect to the recessed portion 123. One of the cutouts 122 provided in the forward rotation direction of the mixing vane 50 has a flat upper engaging surface which inclines downward in the forward rotation direction of the mixing vane 50. On the other hand, the other cutout 122 provided in the reverse rotation direction of the mixing vane 50 has a flat upper engaging surface which inclines downward in the reverse rotation direction of the mixing vane 50. Vertical ribs corresponding to the ribs 118 (see FIGS. 11 and 12A) are provided in a bread vessel corresponding to the bread vessel 111 in the same manner as in the foregoing sixth preferred embodiment. Further, the rotation direction of the mixing vane 50 can be switched manually as in the sixth preferred embodiment.

The other structure is the same as that in the foregoing first preferred embodiment.

The bread producing machine having the foregoing structure operates as follows:

As in the first preferred embodiment, when the mixing process is started with the bread ingredients set in the bread vessel, the inclined upper surfaces of the stoppers 120 and the corresponding cutouts 122 automatically come into engagement with each other according to the rotation direction of the mixing vane 50 so that the vessel unit is urged downward and locked relative to the vessel mounting support 121. Since the upper engaging surface of each stopper 120 is in the form of the symmetrical curved surface as described above and the cutouts 122 are provided at both sides of each recessed portion 123 as described above, all the stoppers 120 are engaged with the corresponding cutouts 122 provided in the rotation direction of the mixing vane 50 irrespective of whether the mixing vane rotates in the forward or reverse direction. Thus, the vessel unit can be fixed to the vessel mounting support 121 reliably. Further, by switching the rotation direction of the mixing vane 50, the mixing strength can be adjusted as in the foregoing sixth preferred embodiment.

Figure 14:
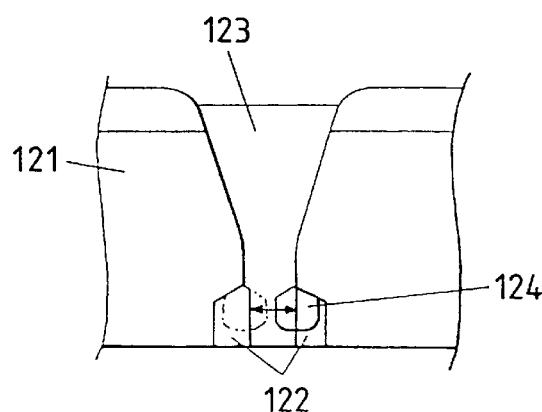
FIG. 14 is a diagram for showing an engaging state between a stopper of a bread vessel support of a vessel unit and a cutout of a vessel mounting support when the vessel unit is locked relative to the vessel mounting support, according to a modification of the seventh preferred embodiment.

FIG. 14 shows a modification of the foregoing seventh preferred embodiment. In this modification, each of stoppers 124 corresponding to the stoppers 120 has an upper engaging surface formed by a pair of inclined flat surfaces which are symmetrical with each other with respect to a straight boundary line therebetween.

The symmetrical flat surfaces incline downward from their boundary line, respectively, that is, the upper engaging surface of the stopper 124 inclines downward both in the forward and reverse rotation directions of the mixing vane 50 with respect to the boundary line. The other structure is the same as that in the foregoing seventh preferred embodiment.

In this modification, since a surface contact is provided between the upper engaging surfaces of the stopper 124 and the cutout 122, the vessel unit can be locked more stably as compared with the foregoing seventh preferred where a point contact is provided between the upper engaging surfaces of the stopper 120 and the cutout 122. On the other hand, in this modification, the higher dimensional accuracy is required for the upper engaging surfaces of the stopper 124 and the cutout 122.

As described above, in the foregoing seventh preferred embodiment and its modification, by switching the rotation direction of the mixing vane, the optimum mixing degree can be achieved depending on a kind of bread or ingredient as in the foregoing sixth preferred embodiment. Further, since all the stoppers are engaged with the corresponding cutouts irrespective of whether the mixing vane is rotated in the forward or reverse direction, the vessel unit can be fixed to the vessel mounting support more stably so as to further reduce the operation sounds during the mixing process as compared with the foregoing sixth preferred embodiment.

Eighth Embodiment

Now, an eighth preferred embodiment of the present invention will be described hereinbelow.

Figure 15A:
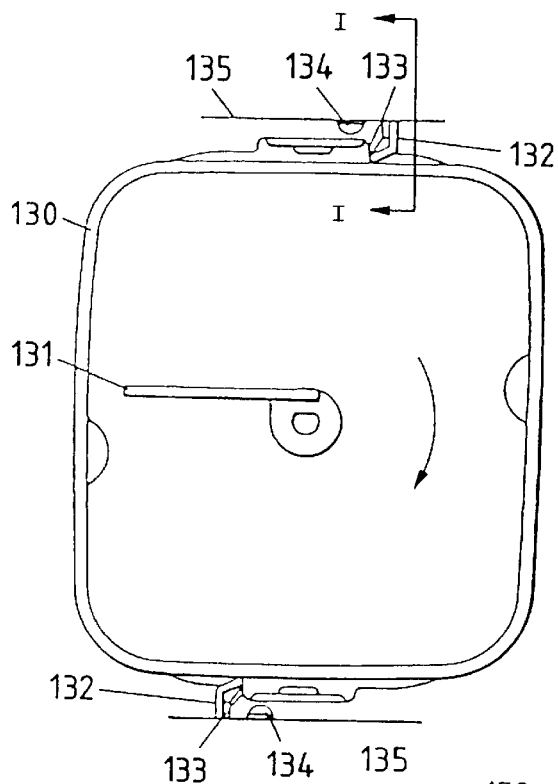
FIG. 15A is a plan view showing a mounted state of a bread vessel according to an eighth preferred embodiment of the present invention.
Figure 15B:
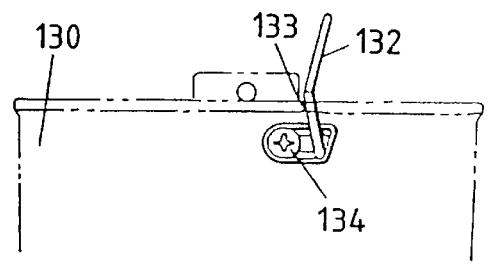
FIG. 15B is a diagram for explaining a positional relationship between the bread vessel and a fixing spring.
Figure 15C:
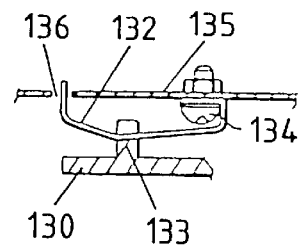
FIG. 15C is a sectional view taken along line A—A in FIG. 15A.
Figure 16:
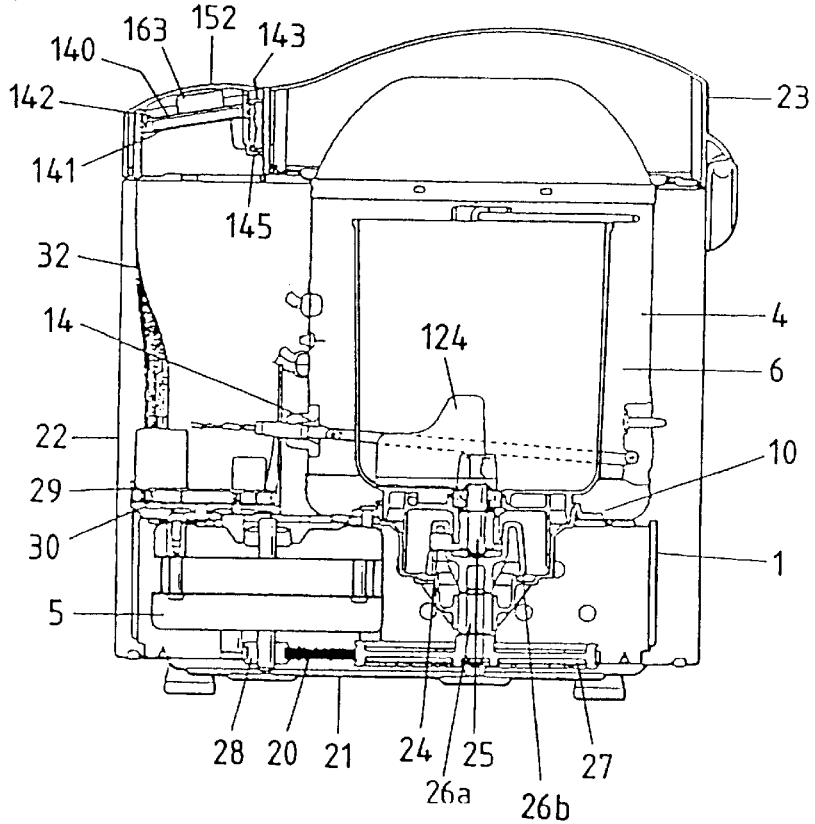
FIG. 16 is a vertical sectional view of a bread producing machine according to a ninth preferred embodiment of the present invention.
Figure 17:
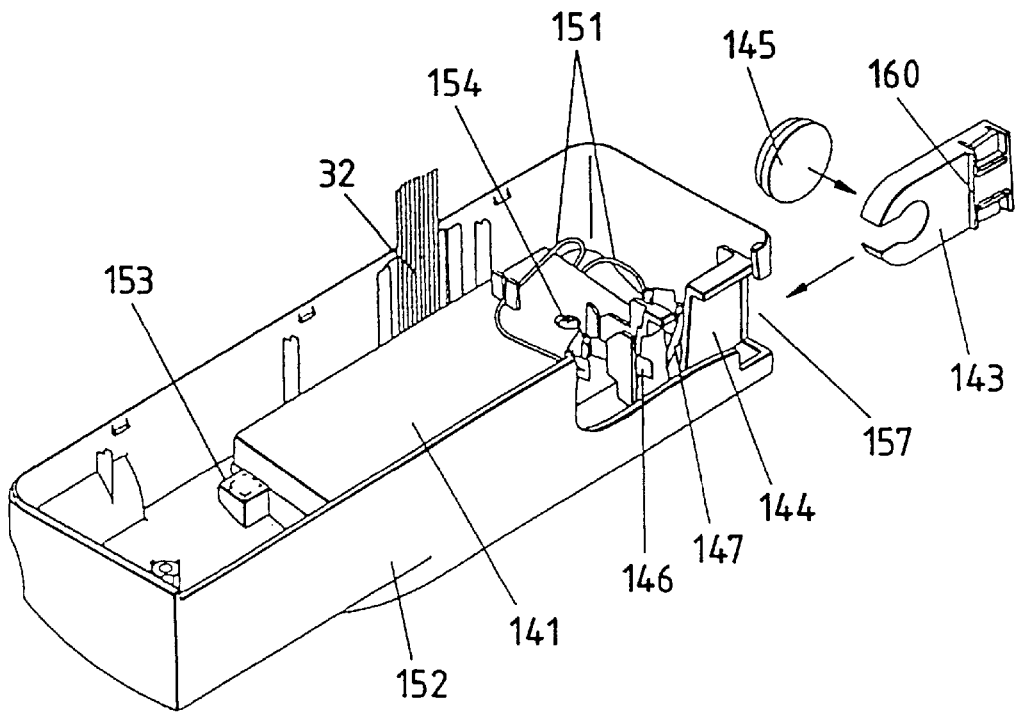
FIG. 17 is a perspective view, seen from below, showing a cover or a mounting body of the bread producing machine according to the ninth preferred embodiment.
Figure 18:
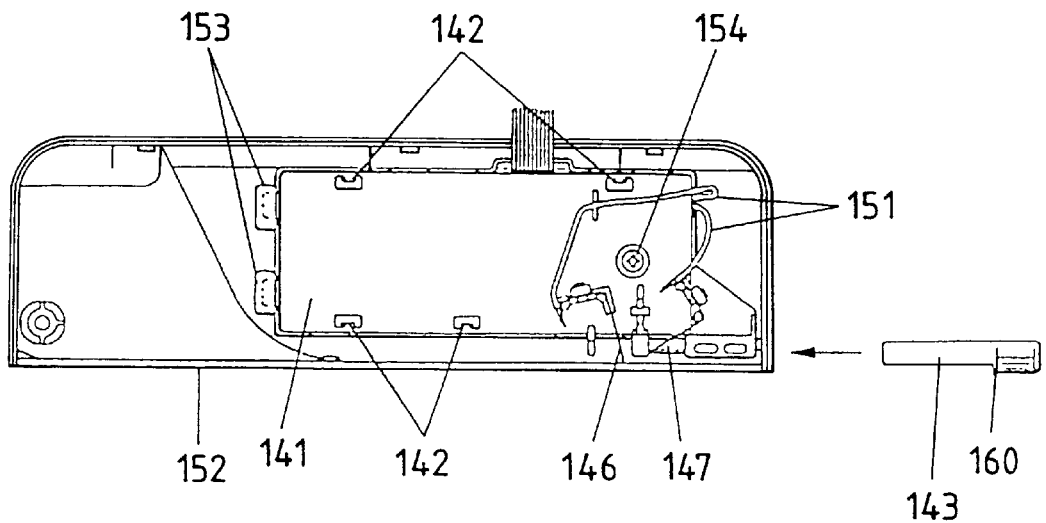
FIG. 18 is a diagram, seen from below, for showing a structure in the cover of the bread producing machine according to the ninth preferred embodiment.
Figure 24:
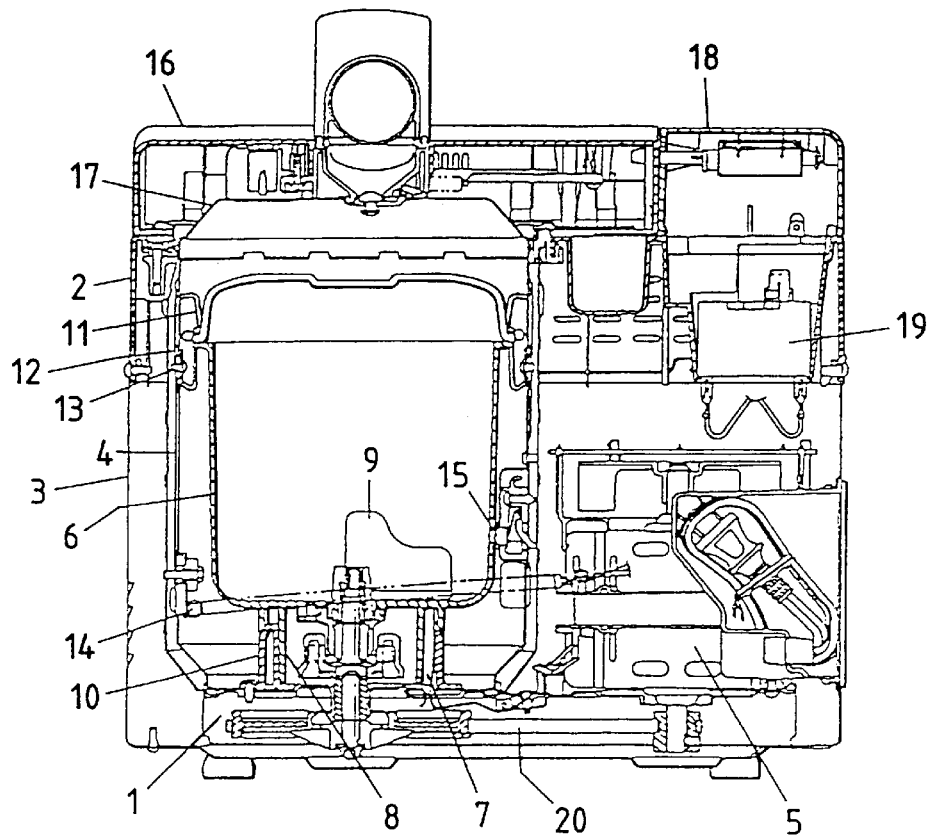
FIG. 24 is a vertical sectional view of a conventional bread producing machine.
Figure 25:
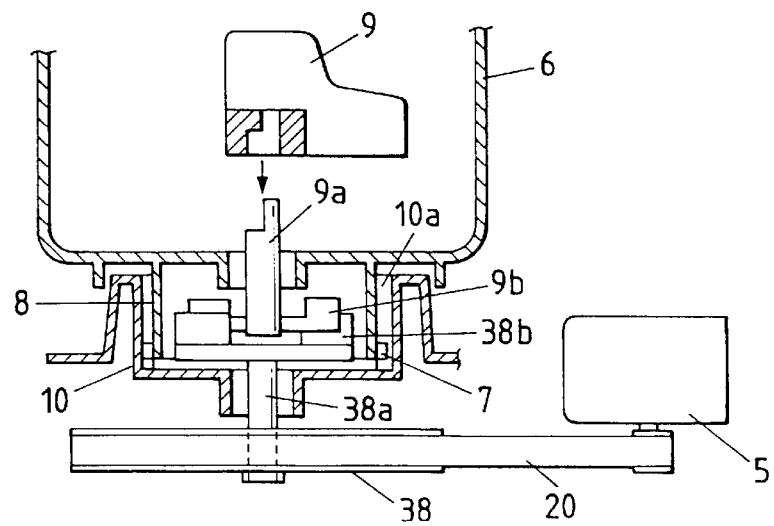
FIG. 25 is a partial sectional view of the conventional bread producing machine shown in FIG. 24 for showing a driving mechanism of a mixing vane.

In FIGS. 15A, 15B and 15C, numeral 130 denotes a bread vessel corresponding to the bread vessel 6 in the prior art of FIG. 24. As in the prior art, the bread vessel 130 is formed at its bottom with a cylindrical bread vessel support having fixed ribs 7 which are integrally formed on the lower circumference thereof for preventing rotation of the bread vessel support and thus the bread vessel 130. A mixing vane 131 is detachably mounted in the bread vessel 130 for mixing the bread ingredients set therein. The mixing vane 131 is rotated only in one direction (clockwise direction) in this embodiment. A pair of fixing springs 132 are arranged in a baking chamber 135 corresponding to the baking chamber 4. Specifically, each of the fixing spring 132 has one end fixed to an inner surface of a surrounding wall of the baking chamber 135 by means of a screw 134, and the other end protruding outward through an opening 136 formed at the surrounding wall of the baking chamber 135. Each fixing spring 132 is formed of an elastic steel wire and has an asymmetric shape which is bent three-dimensionally as appreciated from FIGS. 15A, 15B and 15C. Each fixing spring 132 is provided for firmly holding the bread vessel 130 at its stepped portion 133, more specifically, only at one side of the stepped portion 133 located in the rotation direction of the mixing vane 131. The stepped portion 133 extends horizontally and forms a part of a mounting bracket provided at an upper end of the bread vessel 130 for pivotally mounting the handhold. At a bottom of the baking chamber 135 is fixedly provided a vessel mounting support of an essentially cylindrical shape which receives therein the bread vessel support for fixing the bread vessel 130 relative to the vessel mounting support. The other structure is essentially the same as that in the prior art of FIG. 24.

In this embodiment, since each fixing spring 132 is mounted only at one side of the stepped portion 133 located in the rotation direction of the mixing vane 131, the bread vessel 130 does not run over the fixing springs 132 very much when setting the bread vessel 130 in the baking chamber 135. Further, since the resistance due to the pressing force of each fixing spring 132 is largely reduced, the mounting and detaching operations of the bread vessel 130 can be easily achieved. Further, since the mixing vane 131 is rotated only in one direction, the bread vessel 130 can be fixed sufficiently to reduce the operation sounds during the mixing process only by pressing to hold the foregoing one side of the stepped portion 133. Moreover, since the fixing spring 132 can be reduced in size by half or less as compared with that in the prior art of FIG. 24, the material cost can be reduced.

Ninth Embodiment

Now, a ninth preferred embodiment of the present invention will be described hereinbelow.

Figure 28:
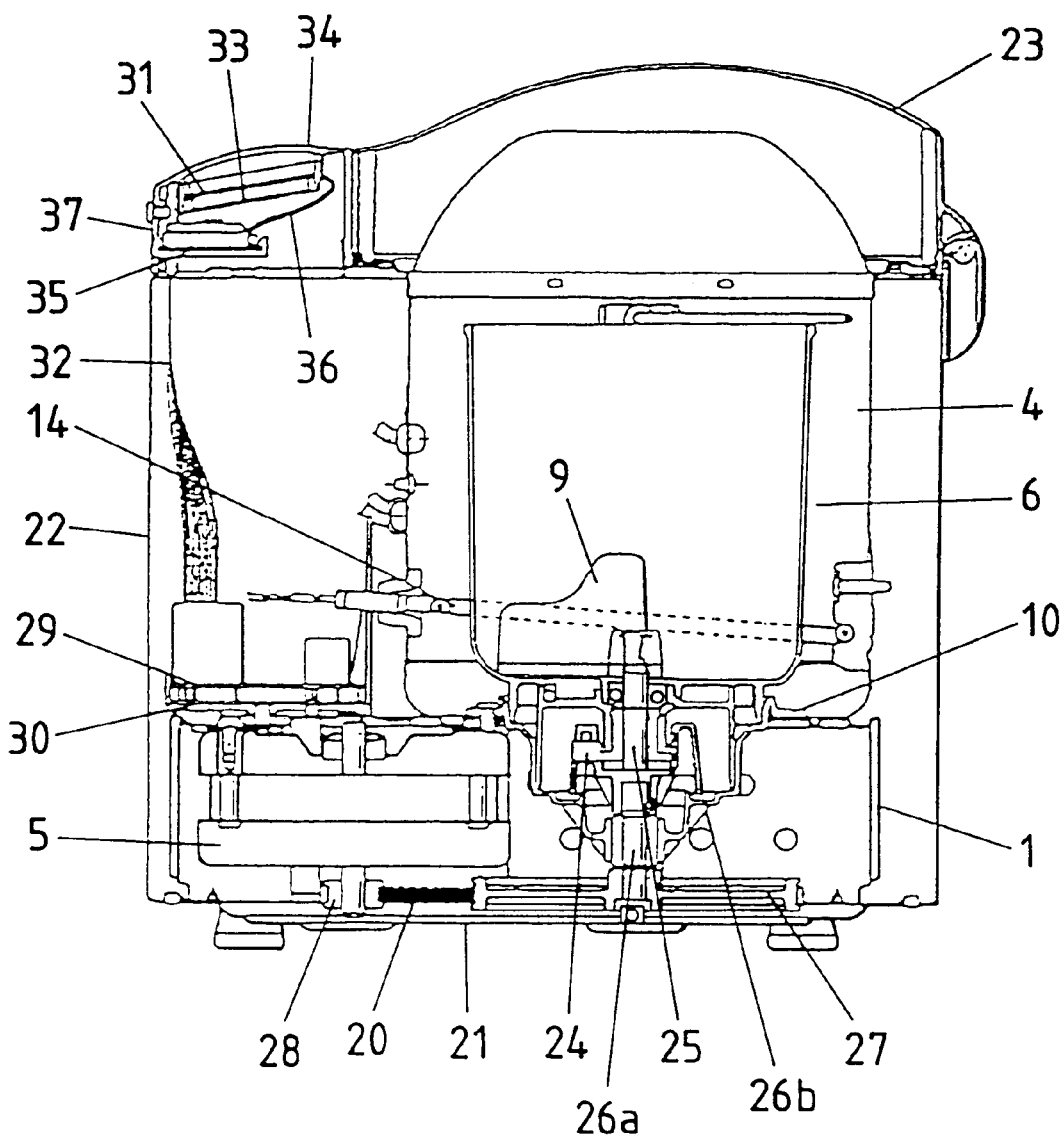
FIG. 28 is a vertical sectional view of another conventional bread producing machine.

In FIGS. 16 to 21 showing the ninth preferred embodiment, the same or like components are represented by the same reference numerals as those in FIG. 28 showing the prior art, so as to omit explanation thereof.

In these figures, a microcomputer board 140 is connected to the power supply board 29 via the cable 32 and held in a receiving section 141 by means of claws 142 which hold the rim of the microcomputer board 140. On the microcomputer board 140 is provided a liquid-crystal display 163 for showing an ongoing cooling process, a cooking time and the like. On the outer periphery of the receiving section 141, an L-shaped member 144 is disposed for guiding a battery holder 143 when setting it into a cover or mounting body 152. Further, on the outer periphery of the receiving section 141, a positive terminal 146 and a negative terminal 147, each having an essentially [-shape, are fixedly provided for supplying the electric power to the microcomputer board 140 from a coin-shaped lithium battery 145. Specifically, each of the positive and negative terminals 146 and 147 is held between bosses 149 which are fixed to the outer periphery of the receiving section 141, and a cut-turnover portion 150 of each terminal is engaged with a gate-shaped rib 148 which is also fixed to the outer periphery of the receiving section 141. As seen in FIG. 21, each boss 149 has a recessed corner, as a fitting portion, into which a corresponding corner of the terminal is fitted. Similarly, the rib 148 has a recessed portion, as a fitting portion, into which the cut-turnover portion 150 of each terminal is fitted. It is preferable that the positive and negative terminals 146 and 147 are arranged at an angle of 60° to 120° therebetween for ensuring a proper contact pressure to the battery 145. In this embodiment, an angle between the positive and negative terminals 146 and 147 is set to 75°. Numeral 151 denotes leads for connection between the positive terminal 146 and the microcomputer board 140 and between the negative terminal 147 and the microcomputer board 140, respectively.

The receiving section 141 provided with the microcomputer board 140 and the positive and negative terminals 146 and 147 as described above has one end engaged with stoppers 153 of the cover 152 and is fixed to the cover 152 by means of a screw 154. The battery holder 143 holds the battery 145 by means of claws 155 and 156. The cover 152 or the mounting body accommodating the receiving section 141 therein is fixed to the plate-metal body 22 by means of screws. The battery holder 143 holding the battery 145 is mounted to the cover 152 with a horizontal linear motion through an opening 157 of the cover 152. While mounted in the cover 152, the battery holder 143 is held between the L-shaped member 144 of the receiving section 141 and a wall of the cover 152. The battery holder 143 is further held against the rim of the opening 157 by means of a pair of depressable stoppers 158 and 159 of the battery holder 143. Specifically, when mounting the battery holder 143, the stoppers 158 and 159 are automatically depressed by the contact with the rim of the opening 157 and then restored to lock the battery holder 143 relative to the cover 152. On the other hand, when detaching the battery holder 143, the user draws out the battery holder 143 horizontally while depressing the stoppers 158 and 159. Since each of the stoppers 158 and 159 has a stepped shape, the stoppers can be depressed manually at the opening 157 (see FIGS. 19A, 19B). The other structure is the same as that in the prior art shown in FIG. 28.

In this embodiment, since the battery 145 is mounted to the cover 152 via the battery holder 143, when the battery 145 runs out, only the battery 145 can be changed to reduce the battery changing cost as compared with the prior art where the battery board with the battery thereon is replaced entirely. Further, since the battery taken out from within the cover 152 is held by the battery holder 143, it is not likely that the taken-out battery is lost. Further, since the battery change can be performed only by setting a new battery 145 in the battery holder 143 and inserting it into the cover 152, a manual operation using a tool, such as a line connecting operation, which was required in the prior art, is not required.

Further, when the user tries to insert the battery holder 143 into the opening 157 of the cover 152 reversely in error, a given rim portion 160 of the battery holder 143 is so extended as to hit the rim of the opening 157 so that the battery holder 143 can not be inserted to a normal mounting position in the cover 152. Accordingly, the reverse insertion of the battery holder 143 can be effectively prevented so as to avoid a leak of the battery or the like, thus ensuring the normal operation of the machine.

Further, the battery holder 143 is held between the L-shaped member 144 of the receiving section 141 and the wall of the cover 152 and further held against die rim of the cover 152 defining the opening 157 by means of the pair of depressable stoppers 158 and 159. Thus, the battery holder 143 is securely held in the cover 152 so that positive and negative electrodes of the battery 145 achieve the stable contacts with the positive and negative terminals 146 and 147 even when the motor 5 rotates to produce vibration during the mixing process of the bread ingredients.

Further, for detaching the battery holder 143 from the cover 152, it is necessary to draw out the battery holder 143 while depressing the stoppers 158 and 159, that is, the two operations are required to be performed simultaneously. This prevents, for example, a baby from taking out the battery holder 143 and putting the battery 145 into the mouth. Further, it is arranged that a direction of depressing the stoppers 158 and 159 and a direction of drawing out the battery holder 143 are orthogonal to each other. This makes it further difficult for the baby to take out the battery holder 143 from the cover 152.

Further, each of the positive and negative terminals 146 and 147 is held between the bosses 149, and the cut-turnover portion 150 of each terminal is engaged with the gate-shaped rib 148. Accordingly, the positive and negative terminals 146 and 147 are both prohibited from moving in any direction so as to be securely fixed to the receiving section 141. This ensures the reliable contact between the battery 145 and the terminals 146 and 147 to prevent an abnormal consumption of the battery 145 due to increment of contact resistance at their contact points caused by contact failure.

Further, when mounting each terminal to the receiving section 141 during the assembling process, since a click can be clearly noticed upon engagement of the cut-turnover portion 150 with the gate-shaped rib 148, assembling failure is not likely to occur.

Further, each of the positive and negative terminals 146 and 147 is essentially [-shaped and held by the two bosses 149, each terminal is stably fixed to the receiving section 141. Since the positive and negative terminals 146 and 147 have the same shape with each other, the reduction in cost can be achieved by commonality of the parts.

Tenth Embodiment

Now, a tenth preferred embodiment of the present invention will be described hereinbelow.

Figure 22:
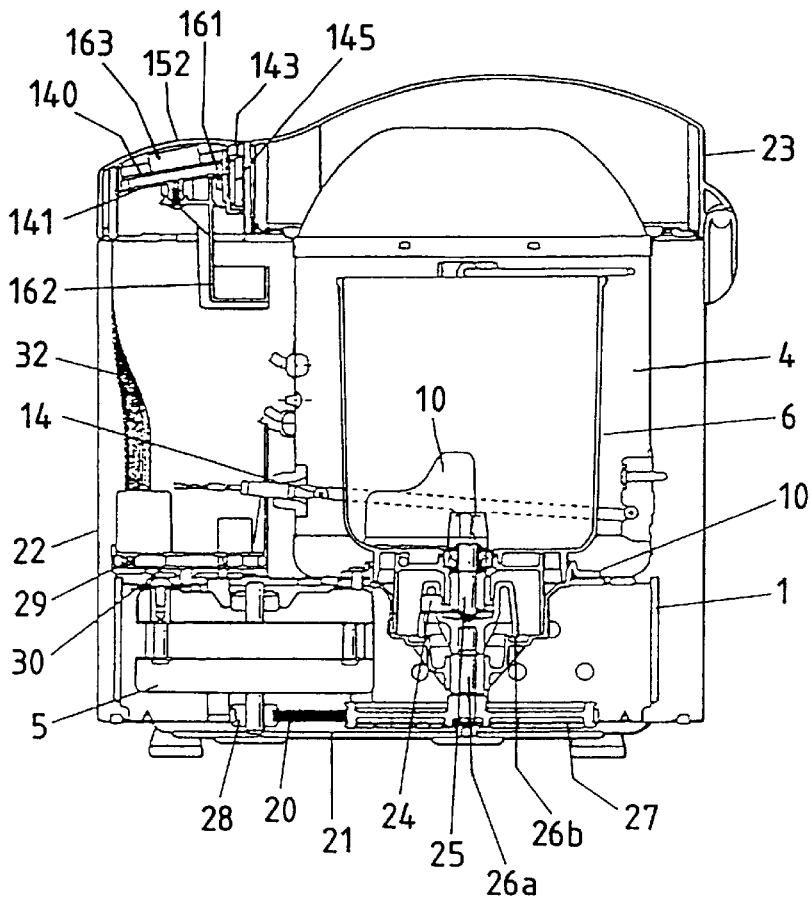
FIG. 22 is a vertical sectional view of a bread producing machine according to a tenth preferred embodiment of the present invention.
Figure 23:
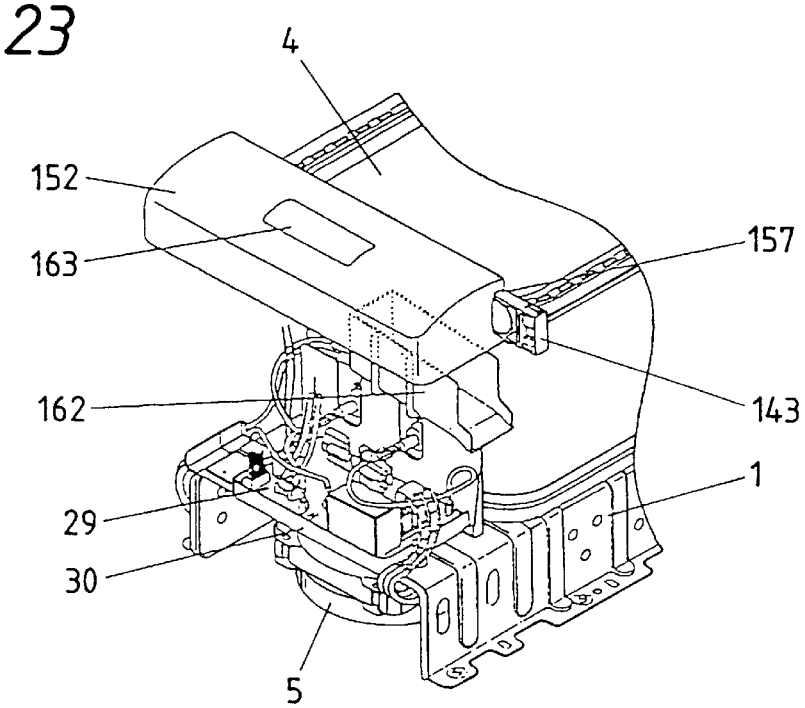
FIG. 23 is a perspective view showing a main part of the bread producing machine according to the tenth preferred embodiment.

In FIGS. 22 and 23 showing the tenth preferred embodiment, the same or like components are represented by the same reference numerals as those in FIGS. 16 to 21 showing the ninth preferred embodiment, so as to omit explanation thereof.

In this embodiment, as in the foregoing ninth preferred embodiment, the microcomputer board 140 is held in the receiving section 141 by means of the claws 142 which hold the rim of the microcomputer board 140. Adjacent to the receiving section 141, the L-shaped member 144 is disposed for guiding the battery holder 143 when setting it into the cover or the mounting body 15. On the outer periphery of the receiving section 141, battery terminals 161 are fixedly provided for supplying the electric power to the microcomputer board 140 from the coin-shaped lithium battery 145.

The receiving section 141 provided with the microcomputer board 140 and the battery terminals 161 has one end engaged with the stoppers 153 of the cover 152 and is fixed to the cover 152 by means of the screw 154. The battery holder 143 holding the battery 145 is mounted and detached through the opening 157 of the cover 152.

As shown in FIGS. 22 and 23, a water receptacle 162 having an essentially [-shape in section is fixedly disposed below the receiving section 141. By providing the water receptacle 162, even when a liquid, such as water, invades the cover 152 through the opening 157, the power supply board 29 which is a live part on the chassis 1 is prevented from receiving the invaded water so that leak and firing can be avoided. Specifically, the invaded water drops into the water receptacle 162 and then is guided away from the live part so that the invaded water drops to an end portion of the chassis 1 and then is discharged outside the machine. The other structure is the same as that in the foregoing ninth preferred embodiment.

In the baking process, an atmospheric temperature in the baking chamber 4 is increased up to a high value of 150° C.~230° C. by the heater 14 for baking bread. In this case, without the water receptacle 162, an atmospheric temperature around the coin-shaped lithium battery 145 normally becomes about 80° C.~90° C. In general, the coin-shaped lithium battery reduces its life duration by half or so as an ambient temperature increases by 10° C. Accordingly, the high temperature of about 80° C.~90° C. is, in general, close to a critical value for the use of the coin-shaped lithium battery. On the other hand, with the water receptacle 162, since it also works as a thermal insulation plate, an atmospheric temperature around the coin-shaped lithium battery 145 is suppressed to about 70° C.~80° C., which has been confirmed through experiments.

While the present invention has been described in terms of the preferred embodiments, the invention is not to be limited thereto, but can be embodied in various ways without departing from the principle of the invention as defined in the appended claims.

What is claimed is:

1. A bread producing machine comprising:

a baking chamber provided therein with a heater;

a bread vessel provided in said baking chamber and having therein a mixing vane which rotates in one direction for mixing a bread ingredient;

a bread vessel support provided at an underside of said bread vessel in a fixed relationship thereto;

a vessel mounting support for holding said bread vessel support;

a motor for driving said mixing vane;

a control unit for controlling energization of said heater and said motor; and a fixing member attached to an inner surface of the baking chamber and having an asymmetric shape, said fixing member contacting only one side of a given upper portion of said bread vessel, said one side of said given upper portion located in the rotation direction of said mixing vane.

2. A bread producing machine as defined in claim 1, wherein said fixing member applies a force to said one side of said given upper portion that is opposite in direction to the rotation direction of said mixing vane.

3. A bread portion machine as defined in claim 1, wherein said fixing member applies a force to said one side of said given upper portion that is opposite in direction to the rotation direction of said mixing vane.

4. A bread producing machine comprising:

a baking chamber provided therein with a heater;

a bread vessel provided in said baking chamber that includes a mounting bracket at an upper end of the bread vessel having at least one stepped portion that extends horizontally from the upper end of the bread vessel, and a mixing vane which rotates in one direction for mixing a bread ingredient;

a bread vessel support provided at an underside of said bread vessel in a fixed relationship thereto;

a vessel mounting support for holding said bread vessel support;

a motor for driving said mixing vane;

a control unit for controlling energization of said heater and said motor; and at least one fixing member, which is attached to an inner surface of the baking chamber and has an asymmetric shape, that contacts only one side of the stepped portion of the mounting bracket.

* * * * *